(12) United States Patent
Copenhafer

(10) Patent No.: US 7,638,109 B2
(45) Date of Patent: Dec. 29, 2009

(54) PRODUCTION OF SODIUM SESQUICARBONATE AND SODIUM CARBONATE MONOHYDRATE

(75) Inventor: William C. Copenhafer, Yardley, PA (US)

(73) Assignee: FMC Corporation, Philadelphia, PA (US)

( * ) Notice: Subject to any disclaimer, the term of this patent is extended or adjusted under 35 U.S.C. 154(b) by 443 days.

(21) Appl. No.: 11/640,791

(22) Filed: Dec. 18, 2006

(65) Prior Publication Data

US 2007/0140945 A1 Jun. 21, 2007

Related U.S. Application Data

(60) Provisional application No. 60/752,483, filed on Dec. 21, 2005.

(51) Int. Cl.
*C01D 7/00* (2006.01)

(52) U.S. Cl. .............. 423/421; 423/425; 423/427; 423/165; 423/206.1; 423/206.2; 23/302 T; 299/4; 299/5; 166/245; 166/263

(58) Field of Classification Search .............. 423/206.1, 423/206.2, 165, 421, 425, 427; 209/4, 5; 166/245, 263; 23/302 T; 299/4, 5
See application file for complete search history.

(56) References Cited

U.S. PATENT DOCUMENTS

| | | | |
|---|---|---|---|
| 1,853,275 A * | 4/1932 | Houghton et al. ............ 423/192 |
| 2,346,140 A | 4/1944 | Pike |
| 2,388,009 A | 10/1945 | Pike |
| 2,625,384 A | 1/1953 | Pike |
| 2,639,217 A | 5/1953 | Pike |
| 2,780,520 A | 2/1957 | Pike |
| 2,792,282 A | 5/1957 | Pike |
| 2,798,790 A | 7/1957 | Pike |
| 3,119,655 A * | 1/1964 | Frint et al. ................... 423/186 |
| 3,184,287 A * | 5/1965 | Gancy ......................... 423/198 |
| 3,264,057 A | 8/1966 | Miller |
| 3,273,958 A | 9/1966 | Peverley |
| 3,273,959 A | 9/1966 | Miller |
| 3,361,540 A | 1/1968 | Peverley |
| 4,401,635 A | 8/1983 | Frint |
| 4,815,790 A * | 3/1989 | Rosar et al. .................... 299/4 |
| 5,192,164 A * | 3/1993 | Frint et al. ............. 405/129.25 |
| 5,238,664 A | 8/1993 | Frint |
| 5,262,134 A | 11/1993 | Frint |
| 5,283,054 A | 2/1994 | Copenhafer |
| 5,575,922 A | 11/1996 | Green |
| 5,618,504 A | 4/1997 | Delling |
| 5,766,270 A | 6/1998 | Neuman |
| 5,955,043 A | 9/1999 | Neuman |
| 6,207,123 B1 | 3/2001 | Tanaka |
| 6,228,335 B1 | 5/2001 | Copenhafer |
| 6,322,767 B1 | 11/2001 | Neuman |
| 6,428,759 B1 | 8/2002 | Smith |
| 6,576,206 B2 | 6/2003 | Copenhafer |
| 6,576,209 B2 | 6/2003 | Tanaka |
| 6,589,497 B2 | 7/2003 | Smith |
| 2003/0007923 A1 * | 1/2003 | Copenhafer et al. ......... 423/427 |

* cited by examiner

*Primary Examiner*—Steven Bos

(57) ABSTRACT

A process for the production and recovery of crystalline sodium sesquicarbonate and of crystalline sodium carbonate monohydrate from aqueous liquors containing sodium carbonate and sodium bicarbonate. The crystalline products may optionally be heated or calcined to produce soda ash. The process is particularly suited for the recovery of soda ash from aqueous minewater streams obtained from solution mining of subterranean trona ore deposits.

20 Claims, 5 Drawing Sheets

PRODUCTION OF SODIUM SESQUICARBONATE AND SODIUM CARBONATE MONOHYDRATE

This application claims the benefit of U.S. Provisional Application No. 60/752,483, filed Dec. 21, 2005.

BACKGROUND OF THE INVENTION

The present invention relates to a process for the production and recovery of crystalline sodium sesquicarbonate and of crystalline sodium carbonate monohydrate from aqueous liquors containing sodium carbonate and sodium bicarbonate and, particularly, from aqueous liquors obtained from the solution mining of subterranean trona ore deposits.

Sodium carbonate, also called soda ash, is an important, high volume chemical produced in the United States and used in the manufacture of glass, chemicals, soaps and detergents and aluminum, as well as in textile processing, petroleum refining and water treatment, among many other uses.

In the United States, almost all sodium carbonate is obtained from subterranean deposits of naturally occurring trona ore. The largest known trona ore deposits in the United States are located in Green River, Wyo. and are typically about 800 to 3000 feet below ground level; these trona ore deposits are actively mined by several companies.

Trona ore consists primarily (80-95 percent) of sodium sesquicarbonate ($Na_2CO_3 \cdot NaHCO_3 \cdot 2H_2O$), and lesser amounts of sodium chloride (NaCl), sodium sulfate ($Na_2SO_4$), organic matter, and insolubles such as clay and shales. A typical analysis of crude trona ore being mined at Green River, Wyo. is as follows:

| Constituents | Weight Percent (wt %) |
|---|---|
| sodium sesquicarbonate | 90 |
| sodium chloride (NaCl) | 0.1 |
| sodium sulfate ($Na_2SO_4$) | 0.02 |
| organic matter | 0.3 |
| insolubles (clay and shales) | 9.6 |

Trona ore may be recovered from subterranean deposits, for further processing into soda ash, by mechanical mining techniques or by any of several various solution mining methods. The Green River trona ore deposits are presently being commercially mined both by mechanical mining and by solution mining processes.

Mechanical mining, also called dry mining, is carried out underground in the ore beds by mining crews and include room-and-pillar and long wall methods. Mechanical mining methods are relatively costly and leave unrecovered a significant fraction of the trona ore in the beds being mined.

Solution mining processes represent an economical alternative to mechanical mining, for recovery of the same sodium carbonate values from subterranean trona ore deposits. Solution mining involves injecting water or other aqueous-based mining solution, via a drilled well hole, into a deposit of trona ore; allowing the mining solution to dissolve soluble ore; pumping the resulting mining solution (minewater) via a drilled well hole to the surface; and processing the minewater to recover the dissolved ore values from the solution in the form of sodium carbonate or other related sodium based chemicals. Solution mining methods are also useful for recovering alkali values from depleted ore deposits that have previously been mechanically mined.

As its chemical composition indicates, trona ore requires processing in order to recover sodium carbonate. Two conventional surface process methods for recovery of sodium carbonate (soda ash) are the "sesquicarbonate" process and the "monohydrate" process, named after their respective crystallization products.

The sesquicarbonate process involves dissolution of mechanically-mined and crushed trona ore in a recycled hot aqueous liquor containing a molar excess of dissolved carbonate over bicarbonate, in order to effect congruent dissolution of the sodium sesquicarbonate in the trona ore; clarifying and filtering the ore-fortified solution to remove insoluble matter present in the ore; introducing the filtered aqueous liquor into a series of vacuum crystallizers to crystallize sodium sesquicarbonate by evaporation of water and cooling; withdrawing crystallizer slurry and recovering crystallized sodium sesquicarbonate by centrifugation from the crystallizer slurry; calcining the recovered sodium sesquicarbonate crystals at elevated temperature to convert the sesquicarbonate to a soda ash product having light bulk density; and recycling the crystallizer mother liquor to dissolve additional crude trona, as first described.

The "monohydrate" process was developed in response to the need for a more dense soda ash than that produced by the sesquicarbonate process. Most of the soda ash recovered from the Green River trona ore deposits is currently produced from mechanically mined trona ore via the monohydrate process or variants thereof.

The monohydrate process involves crushing and screening the bulk trona ore which, as noted above, contains sodium sesquicarbonate ($Na_2CO_3 \cdot NaHCO_3 \cdot 2H_2O$) as well as impurities such as silicates and organic matter. The crushed and screened trona ore is then calcined, i.e., heated, at elevated temperatures greater than about 150° C. to convert the ore's sodium bicarbonate content to a crude sodium carbonate.

The crude sodium carbonate is dissolved in a recycled aqueous liquor which is clarified and filtered to remove the insoluble solids. The aqueous liquor is sometimes carbon treated to remove dissolved organic matter which may cause foaming and color problems in the final product, and is again filtered to remove entrained carbon. The aqueous liquor, fortified with dissolved sodium carbonate from the calcined ore, is then fed to a high temperature evaporative crystallization circuit generally having one or more effects (evaporators), to evaporate water and crystallize the desired product, sodium carbonate monohydrate, as the stable crystal phase. The resulting crystal slurry is withdrawn from the crystallizer, centrifuged, and the separated monohydrate crystals are sent to dryers to remove the water of hydration and to produce a dense soda ash product.

The crystallizer mother liquor remaining after separation and recovery of the monohydrate is recycled as an aqueous liquor stream, as first described, to dissolve additional calcined ore. A portion of the recycled mother liquor stream is purged to prevent the buildup of soluble impurities in the recycling aqueous liquor.

Numerous solution mining techniques are described in the prior art. In many of these prior art solution mining processes, a primary objective was to maximize solubilization of the trona ore in the mining solvent or to otherwise provide a concentrated aqueous effluent solution, or brine, for further processing to recover soda ash. Examples of these prior art approaches include the use of sodium hydroxide-containing mining solutions or fortification of an aqueous effluent with added sodium carbonate values. The resulting concentrated solutions may then be processed into soda ash, for example, by using conventional surface processing techniques such as the sesquicarbonate process or the monohydrate process.

Other solution mining methods, that do not rely on producing soda ash via the sesquicarbonate or monohydrate processes, are also described in the prior art for processing of solution mining effluent liquors. These prior art methods typically involve complex procedures, involving multiple steps in which various forms of sodium carbonate are crystallized either as alternatives to sodium carbonate monohydrate or sodium sesquicarbonate, or as intermediates used to make these latter products. These additional intermediate steps not only add to the complexity of the overall process but also add significant economic costs and inefficiencies to these soda ash recovery techniques.

The solution mining method of choice to recover soda ash from trona ore deposits or from other $Na_2CO_3$-containing ore deposits must be reconciled with one marketplace factor.

The type of soda ash most in demand in the marketplace is dense soda ash made from sodium carbonate monohydrate. Demand also exists for light density soda ash made from calcined sodium sesquicarbonate, and for sodium sesquicarbonate per se. As a result, other sodium carbonate species made in prior art processes, e.g., sodium carbonate decahydrate and true anhydrous sodium carbonate, do not represent significant factors in the marketplace. Prior art solution mining processes which make such species are typically inefficient, since these sodium carbonate-based entities become intermediates used to make the desired monohydrate soda ash product.

Prior art solution mining processes that illustrate these drawbacks include the following, by way of example.

In U.S. Pat No. 5,262,134, Frint et al. disclose a process for producing soda ash from a solution mining effluent brine containing sodium carbonate and sodium bicarbonate by first crystallizing and recovering sodium sesquicarbonate as a first product. Next, sodium carbonate decahydrate is crystallized at low temperature and recovered from the sesquicarbonate crystallizer mother liquor that remains after separation of the sesquicarbonate product. The recovered sodium carbonate decahydrate is heated and redissolved in solution, and then sodium carbonate monohydrate is crystallized, recovered and dried to make dense soda ash as a second product.

In U.S. Pat No. 5,283,054, Copenhafer et al. disclose a method for producing soda ash from a brine produced by solution mining, in which sodium carbonate decahydrate is again produced as an intermediate crystalline product. Instead of an initial sesquicarbonate crystallization step, the solution mining effluent brine is first heated to evaporate water and decompose a portion of sodium bicarbonate. The concentrated and $CO_2$-stripped stream is then treated with caustic soda to neutralize sodium bicarbonate still remaining in solution. Sodium carbonate decahydrate is crystallized from the $NaHCO_3$-depleted solution at low temperature, recovered and then redissolved by heating. Sodium carbonate monohydrate is crystallized from the decahydrate-derived solution, recovered and dried to make a dense soda ash product.

A hybrid solution mining process is disclosed in U.S. Pat. Nos. 6,207,123 and 6,576,209 of Tanaka et al., in which soda ash is obtained from sodium carbonate monohydrate that is ultimately crystallized from a fortified aqueous stream. The aqueous stream may be obtained from solution mining of trona ore and is fortified with crude sodium carbonate calcinate obtained from calcined dry mined ore. Crude sodium sesquicarbonate is also crystallized as an intermediate; this intermediate is preferably calcined and reincorporated into the fortified aqueous liquor to provide additional crude sodium carbonate values. The sodium carbonate values in the recovered soda ash product (dehydrated sodium carbonate monohydrate) are sourced only in part from the solution mining liquor, with calcined dry mined trona ore being added to the solution mining effluent liquor—the latter calcinate provides approximately half of the recovered soda ash values in the example.

SUMMARY OF THE INVENTION

The present invention is directed to a process for the production of crystalline sodium sesquicarbonate and sodium carbonate from a solution minewater stream by
  (a) withdrawing an aqueous minewater stream containing sodium carbonate and sodium bicarbonate from a solution mining cavity in a subterranean alkali ore deposit;
  (b) crystallizing, in a first crystallizer operation, sodium sesquicarbonate from the aqueous minewater stream, without significant co-crystallization of other alkali species, wherein the aqueous minewater stream introduced into the first crystallizer is substantially free of added sodium carbonate calcinate selected from the group consisting of calcined sodium sesquicarbonate and calcined trona ore;
  (c) separating crystalline sodium sesquicarbonate from mother liquor in the first crystallizer slurry and recovering crystalline sodium sesquicarbonate as a first product;
  (d) converting at least a portion of residual dissolved sodium bicarbonate in the separated first crystallizer mother liquor to carbonate, in a treatment sufficient to permit crystallization of sodium carbonate monohydrate from the treated first crystallizer mother liquor as the sole crystalline species;
  (e) crystallizing, in a second crystallizer operation, sodium carbonate monohydrate from the separated and treated first crystallizer mother liquor, without significant co-crystallization of sodium sesquicarbonate, wherein the separated first crystallizer mother liquor introduced to the second crystallizer is substantially free of added sodium carbonate calcinate selected from the group consisting of calcined sodium sesquicarbonate and calcined trona ore;
  (f) separating crystalline sodium carbonate monohydrate from mother liquor in the second crystallizer slurry and recovering the crystalline sodium carbonate monohydrate; and
  (g) drying the recovered crystalline sodium carbonate monohydrate to produce dense soda ash, as a second product.

In preferred embodiments of this invention, the conversion of at least a portion of the residual sodium bicarbonate to carbonate in the separated first crystallizer mother liquor is effected by neutralizing residual dissolved sodium bicarbonate, using a neutralizing agent selected from the group consisting of lime, slaked lime, and caustic soda; and introducing the neutralized first crystallizer mother liquor into the second crystallizer operation.

Another aspect of the invention is directed to a process for the production of crystalline sodium sesquicarbonate and sodium carbonate from a solution minewater stream by
  (a) withdrawing an aqueous minewater stream containing sodium carbonate and sodium bicarbonate from a solution mining cavity in a subterranean alkali ore deposit;
  (b) evaporating water from the aqueous minewater stream to concentrate the aqueous stream;
  (c) crystallizing, in a first crystallizer operation, sodium sesquicarbonate from the concentrated aqueous minewater stream, without significant co-crystallization of other alkali species, wherein the aqueous minewater stream introduced into the first crystallizer is substantially free of added sodium carbonate calcinate selected from the group consisting of calcined sodium sesquicarbonate and calcined trona ore;

(d) separating crystalline sodium sesquicarbonate from mother liquor in the first crystallizer slurry and recovering crystalline sodium sesquicarbonate as a first product;

(e) converting at least a portion of residual dissolved sodium bicarbonate in the separated first crystallizer mother liquor to carbonate, in a treatment sufficient to permit crystallization of sodium carbonate monohydrate from the treated first crystallizer mother liquor as the sole crystalline species;

(f) crystallizing, in a second crystallizer operation, sodium carbonate monohydrate from the separated and treated first crystallizer mother liquor, without significant co-crystallization of sodium sesquicarbonate, wherein the separated first crystallizer mother liquor introduced to the second crystallizer is substantially free of added sodium carbonate calcinate selected from the group consisting of calcined sodium sesquicarbonate and calcined trona ore;

(g) separating crystalline sodium carbonate monohydrate from mother liquor in the second crystallizer slurry and recovering the crystalline sodium carbonate monohydrate; and (h) drying the recovered crystalline sodium carbonate monohydrate to produce dense soda ash, as a second product.

Still another aspect of the invention is directed to a process for the production of crystalline sodium sesquicarbonate and sodium carbonate monohydrate from a solution minewater stream by (a) withdrawing an aqueous minewater stream containing sodium carbonate and sodium bicarbonate from a solution mining cavity in a subterranean alkali ore deposit;

(b) crystallizing, in a first crystallizer operation, sodium sesquicarbonate from the aqueous minewater stream, without significant co-crystallization of other alkali species, wherein the aqueous minewater stream introduced into the first crystallizer is substantially free of added sodium carbonate calcinate selected from the group consisting of calcined sodium sesquicarbonate and calcined trona ore;

(c) separating crystalline sodium sesquicarbonate from mother liquor in the first crystallizer slurry and recovering crystalline sodium sesquicarbonate as a first product;

(d) neutralizing residual dissolved sodium bicarbonate in the separated first crystallizer mother liquor, to convert at least a portion of the residual sodium bicarbonate to carbonate, in a neutralization treatment sufficient to permit crystallization of sodium carbonate monohydrate from the neutralized first crystallizer mother liquor as the sole crystalline species;

(e) crystallizing, in a second crystallizer operation, sodium carbonate monohydrate from the separated and neutralized first crystallizer mother liquor, without significant co-crystallization of sodium sesquicarbonate, wherein the separated first crystallizer mother liquor introduced to the second crystallizer is substantially free of added sodium carbonate calcinate selected from the group consisting of calcined sodium sesquicarbonate and calcined trona ore;

(f) separating crystalline sodium carbonate monohydrate from mother liquor in the second crystallizer slurry and recovering the crystalline sodium carbonate monohydrate; and (g) drying the recovered crystalline sodium carbonate monohydrate to produce dense soda ash, as a second product.

The process of this invention is particularly adapted for use with trona ore, as the alkali ore deposit.

In preferred embodiments of this invention, the sodium sesquicarbonate first product is calcined to produce light soda ash.

DETAILED DESCRIPTION OF THE INVENTION

Figure 1:
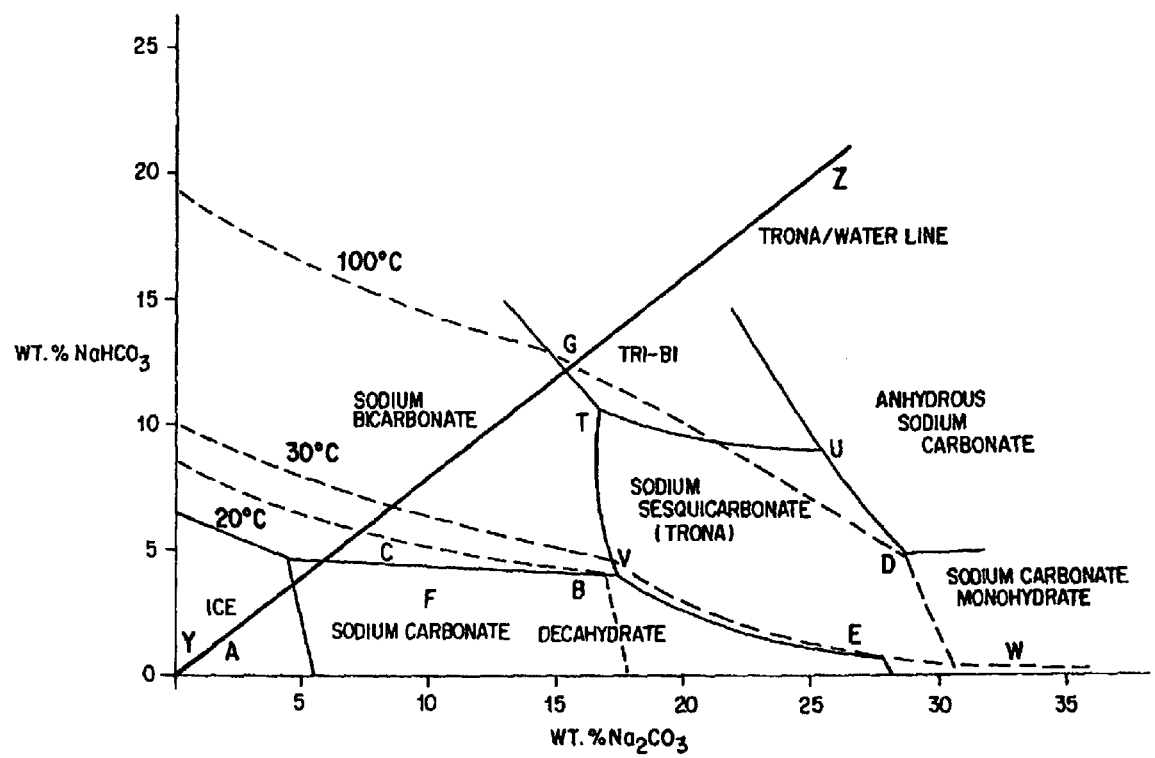
FIG. 1 is a phase diagram for the system sodium carbonate-sodium bicarbonate-water. Solubility isotherms for various species are shown at three temperatures by dashed lines.

Most soda ash that is marketed commercially is dense soda ash, obtained by drying crystalline sodium carbonate monohydrate to remove its water of hydration. Strong demand also exists for sodium sesquicarbonate per se and for calcined sodium sesquicarbonate, which is a lighter density, porous soda ash.

The process of this invention produces both sodium sesquicarbonate and sodium carbonate monohydrate, as first and second products, from an aqueous feed stream containing both sodium carbonate and sodium bicarbonate.

The process facilitates the efficient production of crystalline sodium sesquicarbonate (and light soda ash) and of crystalline sodium carbonate monohydrate (and dense soda ash) from an aqueous minewater effluent stream that is withdrawn from naturally-occurring subterranean alkali ore deposits that are being recovered by solution mining.

The process has the unique advantage of permitting the relative outputs of its two crystalline products to be adjusted over a wide range, in response to changes in marketplace demand. The relative splits of (i) sodium sesquicarbonate (and light soda ash) product and (ii) sodium carbonate monohydrate (and dense soda ash) product may be adjusted with the process of this invention to yield over [9 parts sesquicarbonate product] to [1 part monohydrate product] or less than [1 part sesquicarbonate product] to [9 parts monohydrate product], as well as to yield product splits within these two extremes, as is shown in the Examples.

Another advantage of the invention is that the two desired products, sodium sesquicarbonate and sodium carbonate monohydrate, are produced directly, without the need to crystallize intermediate species, e.g., sodium carbonate decahydrate, that are simply reprocessed to make the desired sodium carbonate monohydrate product.

Production of sodium sesquicarbonate as one of the two desired products in the process of this invention serves as an efficient means to reduce the sodium bicarbonate concentration in the aqueous solution mining effluent stream, prior to the subsequent crystallization of sodium carbonate monohydrate.

Further lowering of the sodium bicarbonate level is effected by treating the first crystallizer mother liquor to convert sodium bicarbonate to carbonate, e.g., with lime or caustic soda used in relatively modest amounts, following the separation and recovery of the crystalline sodium sesquicarbonate product from the mother liquor. This approach may be contrasted with some prior art methods, which require the upstream treatment of the aqueous solution mining effluent stream to decompose large amounts of sodium bicarbonate via steam stripping of carbon dioxide at elevated temperature.

The production of soda ash and sesquicarbonate in this invention is more direct and economical than other methods described in the prior art.

These and other advantages of the process of this invention will become more apparent in the discussion which follows, as well as in the examples illustrating preferred aspects of the invention.

Aqueous Solution Mining (Minewater) Effluent Stream

The present invention is versatile, with respect to the aqueous feed stock used, being adapted for use with a wide variety of aqueous solution mining effluent stream compositions that contain sodium carbonate and sodium bicarbonate. The concentration of sodium carbonate and sodium bicarbonate in the aqueous solution mining effluent and the ratio of the bicarbonate to carbonate dissolved in the aqueous effluent are not critical since the present process is capable of handling such varied feed streams without any material changes in the processing steps or processing conditions.

For these reasons, the treatment of subterranean ore deposits may be carried out in the context of this invention with solution mining solvents having a wide spectrum of compositions and temperatures. The invention may be used in conjunction with solution mining operations using solution mining solvents well known in the prior art, such as water, aqueous waste or recycle streams containing dilute concentrations of sodium carbonate and sodium bicarbonate, sodium hydroxide-containing aqueous solvents (e.g., up to about 6 wt % NaOH), and the like. In the case of dilute aqueous $Na_2CO_3$- and $NaHCO_3$-containing solvents being used as a mining solvent, the solvent should contain amounts of these two components that are less than their respective concentrations in the resulting aqueous solution mining effluent stream, to promote dissolution of the ore being solubilized. The solution mining solvents may be used at a range of temperatures, e.g., ambient (about 15-25° C.) or elevated temperatures.

The terms "aqueous solution mining effluent" and "aqueous minewater effluent" used in this disclosure refer to the aqueous stream (also called a solution, liquor or brine) that is withdrawn or otherwise recovered from a subterranean alkali source, i.e., an ore deposit being solution mined. By contrast, the term "mining solvent" refers to an aqueous stream that is introduced via solution mining techniques to the subterranean ore deposit to effect dissolution of the ore and thereby produce an "aqueous solution mining effluent stream" or "aqueous minewater stream";

The process of this invention lends itself to handling aqueous solution mining effluent streams which are nonuniform, such as those that vary in their sodium bicarbonate to sodium carbonate ratios over the period of time in which solution mining operations are carried out. Such changes in the solution mining effluent composition may occur because of changes in the ore composition per se or in the ore dissolution surface composition as the ore is dissolved, changes in the residence time of the mining solution in the ore cavity, mining temperature, or the like.

Aqueous solution mining effluent streams obtained from solution mining of subterranean alkali ore deposits are typically not completely saturated, with respect to the alkali values dissolved therein. At 25° C., a representative aqueous mining solution may contain about 14 wt % $Na_2CO_3$ and about 4.5 wt % $NaHCO_3$. These and other weight percentages in this disclosure should be understood to mean percent by weight, based on the total weight of the solution.

Nearly saturated solutions obtained from the aqueous dissolution of solid trona ore at 20° C. contain about 17 wt % $Na_2CO_3$ and about 4 wt % $NaHCO_3$. Small differences in temperatures will not significantly change the equilibrium-saturated composition; e.g., a saturated solution at 30° C. contains about 17 wt % $Na_2CO_3$ and about 4.7 wt % $NaHCO_3$.

The aqueous solution mining effluent stream used in the process of this invention preferably has sodium carbonate and sodium bicarbonate concentrations that provide a total alkali value of at least about 8 wt %, more preferably about 10 wt %, and most preferably at least about 15 wt % total alkali. Unlike prior art solution mining processes, the concentration of sodium carbonate and sodium bicarbonate in the aqueous effluent and the ratio of the bicarbonate to carbonate salts are not critical in the present inventive process, which is capable of handling a wide range of effluent stream compositions without material changes in the processing steps or processing conditions. The term "total alkali," or "TA," as used in this disclosure refers to the total weight percent in solution of sodium carbonate and sodium bicarbonate, the latter being expressed in terms of its equivalent sodium carbonate content. For example, a solution containing 17 wt % $Na_2CO_3$ and 4 wt % $NaHCO_3$ would have a total alkali content of 19.5 wt % (17%+(53/84)×4%=19.5% TA).

In the present invention, the temperature of the aqueous solution mining effluent withdrawn from the solution mining cavity is not critical and may be at ambient temperature (about 15-25° C.) or elevated temperature. The present invention is particularly well suited for use with solution mining effluent streams that are elevated in temperature, e.g., having a temperature upon withdrawal from the mining well of at least about 30° C., preferably at least about 40° C. and more preferably at least about 50° C. Such aqueous solution mining effluent streams typically have higher concentrations of sodium carbonate and sodium bicarbonate, providing the overall process with improved soda ash recovery efficiencies.

The aqueous solution mining effluent stream utilized in this invention is preferably obtained from solution mining of subterranean trona ore deposits, such as those located in Green River, Wyo. Other alkali ore sources may also be treated via solution mining to provide the sodium carbonate- and sodium bicarbonate-containing effluent stream. For example, the underground ore deposit that is treated to obtain the aqueous mining solution may contain $Na_2CO_3$- or $NaHCO_3$-containing minerals such as wegscheiderite (primarily $Na_2CO_3 \cdot 3NaHCO_3$) or nahcolite (primarily $NaHCO_3$), and such ore deposits may also be present in combination with trona.

While the preferred source of the effluent stream utilized as a feed stock in this invention is an aqueous solution mining effluent stream derived from the introduction of a solution mining solvent to an ore cavity, it should be apparent that the effluent streams with similar compositions could be generated by other means, either alone or in combination with a mining solvent.

For example, the withdrawn aqueous effluent stream could be derived from naturally occurring aquifers (groundwater) or man-derived underground water sources that seep into a formerly mechanically-mined ore deposit and solubilize alkali values in the residual ore. The withdrawn aqueous effluent stream could likewise be obtained from a tailings injection system, in which dry-mined ore tailings, i.e., waste solids, are introduced as an aqueous slurry into a subterranean cavity.

Aqueous solution mining effluent streams recovered from solution mining of trona or other alkali ore deposit typically contain some undissolved solids or insoluble matter entrained in the effluent stream, e.g., oil shales and dolomite. Prior to the first crystallizer operation of this invention, the aqueous solution mining stream may be treated to remove such insolubles and other undissolved solids, via conventional filtration, settling, clarification or similar treatments.

It should be recognized that the feed stream introduced to the first crystallizer operation described below, or various other process streams, may be pretreated in a number of ways to facilitate their downstream processing, in addition to filtration or clarification to remove insoluble material entrained in the aqueous stream. Such treatments could include preheating, carbon treating to remove organic contaminants, or the addition of treatment chemicals such as crystal growth modifiers, antiscalants or antifoams.

First Crystallizer Operation (Sesquicarbonate Crystallization)

The process of this invention involves a first crystallizer operation, in which sodium sesquicarbonate is crystallized as the sole stable crystal phase, from the aqueous solution mining effluent stream, i.e., aqueous minewater stream.

Figure 2:
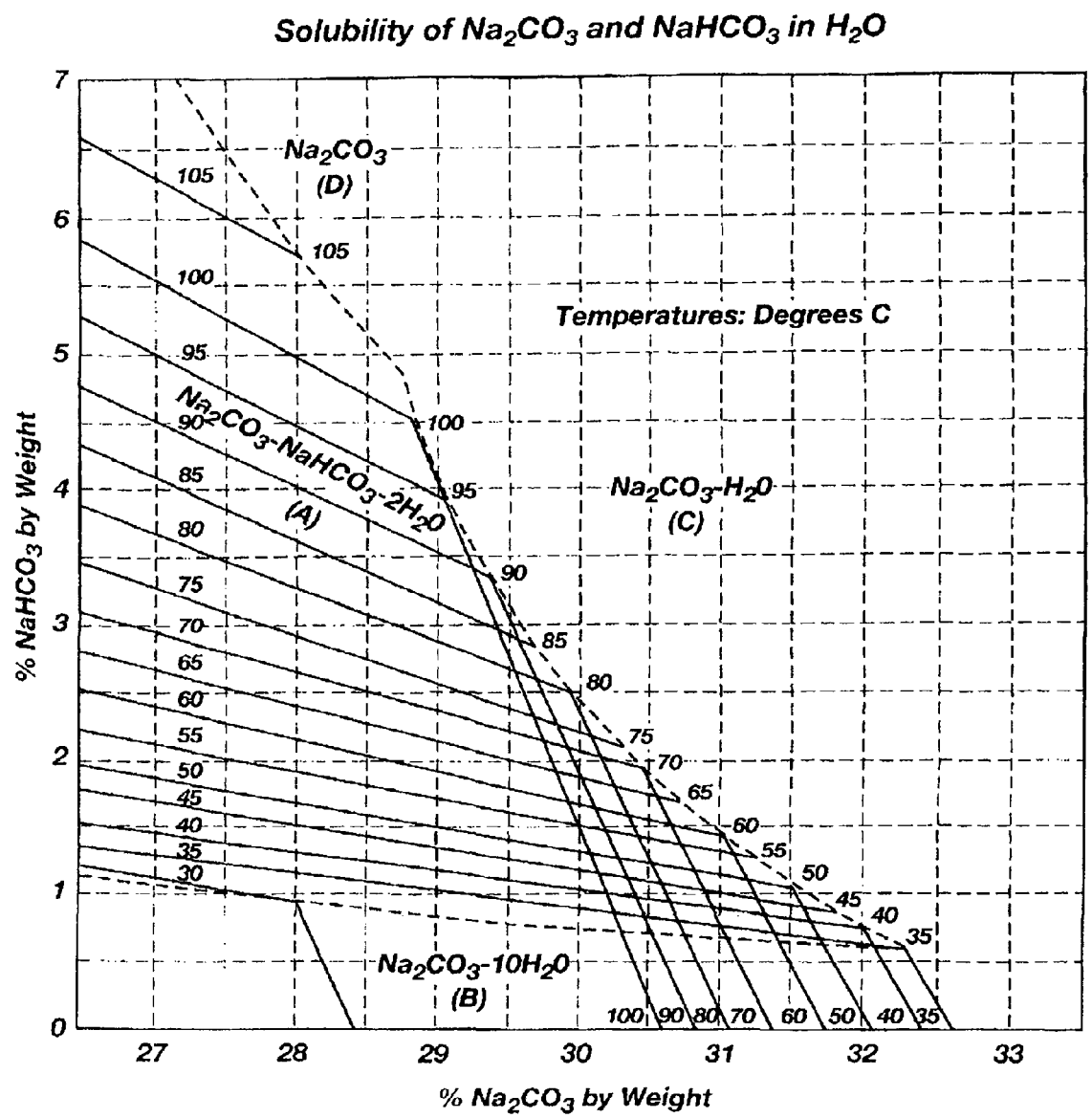
FIG. 2 is a phase diagram for the system sodium carbonate-sodium bicarbonate-water, showing a limited area of the phase diagram of FIG. 1. Solubility isotherms for various species, including sodium sesquicarbonate and sodium carbonate monohydrate, are shown for a range of temperatures by solid lines.

The crystallization of sodium sesquicarbonate alone, without the concurrent crystallization of other solid species, and the compositions of $Na_2CO_3$- and $NaHCO_3$-containing liquors in equilibrium with crystalline sodium sesquicarbonate as the stable solid phase are best understood by reference to the phase diagrams shown as FIGS. 1 and 2. These two Figures depict the phase relationships between water, sodium bicarbonate and sodium carbonate, for aqueous solutions containing a range of concentrations of sodium bicarbonate (Y axis, expressed as percent by weight) and sodium carbonate (X axis, expressed as percent by weight).

The concentration of sodium carbonate and sodium bicarbonate in the aqueous liquor in the first crystallizer must be maintained in a region of the sodium carbonate-sodium bicarbonate-water phase diagram (see FIG. 1) in which sodium sesquicarbonate is the stable crystal phase, where the sodium sesquicarbonate crystals are the only stable solid species present and are in equilibrium with the crystallizer mother liquor. In FIG. 1, this region is labeled as "SODIUM SESQUICARBONATE (TRONA)" and is bounded by points E-V-T-U-D.

FIG. 1 depicts the phase relationships between water, sodium bicarbonate and sodium carbonate, for aqueous solutions containing 0-25 wt % $NaHCO_3$ (Y axis) and 0-35 wt % $Na_2CO_3$ (X axis). In addition, the phase diagram in FIG. 1 shows three isotherms, as dashed lines, for temperatures of 20° C., 30° C. and 100° C. The dashed lines define the solid salts obtained by crystallization of aqueous solutions at the temperature isotherm for the concentrations of sodium carbonate and sodium bicarbonate along the dashed lines; for example, at 30° C. sodium sesquicarbonate is the sole stable solid crystallized from solutions containing, e.g., about 4 wt % $NaHCO_3$ and about 18 wt % $Na_2CO_3$ (near point V) or about 1 wt % $NaHCO_3$ and about 27 wt % $Na_2CO_3$ (near point E).

FIG. 2 shows a portion of FIG. 1, again showing the solid phases that are crystallized from aqueous solutions containing sodium carbonate and sodium bicarbonate at various temperature isotherms. The phase diagram of FIG. 2 shows aqueous solutions containing 0-7 wt % $NaHCO_3$ (Y axis) and 26.5-33.5 wt % $Na_2CO_3$ (X axis). For viewing simplicity, the conventions of FIG. 1 have been reversed in FIG. 2: In FIG. 1 the three isotherms at 20° C., 30° C. and 100° C. are shown by dashed lines, but in FIG. 2 the isotherms, from 30° C. -105° C. C in 5° C. increments, are shown as solid lines.

In FIG. 2, the stable solid phases in equilibrium with solutions at various concentrations of sodium carbonate and sodium bicarbonate are shown; these are noted as sodium sesquicarbonate (A), sodium carbonate decahydrate (B), sodium carbonate monohydrate (C) and anhydrous sodium carbonate (D). The area (A) is the sodium sesquicarbonate region in which crystalline sodium sesquicarbonate is the sole solid species in equilibrium with an aqueous solution of $Na_2CO_3$ and $NaHCO_3$ at any point within area (A).

The temperature isotherms in FIG. 2 are the solid lines running from left to right and on a diagonal, and these isotherms represent the compositions of saturated aqueous solutions of sodium carbonate and sodium bicarbonate at the indicated temperature (ranging from 30-105° C.). The dashed lines in FIG. 2 (the counterparts of the solid lines in FIG. 1) indicate aqueous $Na_2CO_3$- and $NaHCO_3$-containing solutions in which at least two crystal species are the solid stable crystalline form. For solutions represented by the dashed line between regions (A) and (C), the boundary dividing area (A), where sodium sesquicarbonate is the stable solid phase, and area (C), where sodium carbonate monohydrate is the stable solid phase, a mixture of sodium sesquicarbonate and sodium carbonate monohydrate crystals is formed when water is evaporated from such solutions. An inflection point occurs in the dashed line, between the temperature isotherms for 100° C. and 105° C., and this composition point represents an invariant point at which a mixture of sodium sesquicarbonate, sodium carbonate monohydrate and anhydrous sodium carbonate are concurrently formed.

The phase diagrams shown in FIGS. 1 & 2 are for a system that is substantially free of other salts such as sodium chloride and sodium sulfate. However, the principles described here are likewise applicable to aqueous solution mining effluent streams that also contain sodium chloride and/or sodium sulfate in minor amounts, e.g., less than about 5 wt %.

In the process of this invention, the aqueous solution mining effluent stream may be treated, prior to the first crystallizer operation, to adjust or raise its concentration to facilitate crystallization of sodium sesquicarbonate as the sole crystalline species in the first crystallization operation.

It should be recognized that this preliminary concentration or fortification step may be unnecessary, if the composition of the aqueous solution mining effluent stream is already sufficiently concentrated to effect crystallization of sodium sesquicarbonate in the first crystallizer operation.

It must be emphasized that the treated solution mining effluent stream in the process of this invention is substantially free of added crude sodium carbonate calcinate, obtained either from calcination of dry mined trona ore or from calcination of sodium sesquicarbonate. The term "substantially free" as used in the context of this disclosure means that only an insignificant amount, e.g., less than about 5 wt %, of the total alkali content of the referenced stream is sourced from crude sodium carbonate calcinate.

The aqueous solution mining effluent stream may be treated in the process of this invention, prior to the first crystallizer operation, to remove water by evaporation to adjust the composition of the effluent stream to concentrations of sodium carbonate and sodium bicarbonate that provide for operation of the first crystallizer in a manner that crystallizes sodium sesquicarbonate as the sole stable solid phase. The evaporative removal of water is carried out by techniques well known in the prior art, at elevated temperatures using multiple-effect evaporators or mechanical vapor recompression units. Temperatures of about 70° C. to about 115° C., preferably about 90° C. to about 110° C., may be used to remove water and concentrate the sodium carbonate in the aqueous stream.

Evaporation of water from the aqueous solution mining effluent stream under these conditions may also result in the removal of some carbon dioxide, from decomposition of sodium bicarbonate in the aqueous stream. When the aqueous effluent stream is concentrated by evaporation and the bicarbonate concentration is increased, the carbon dioxide vapor pressure above the solution increases and as water vapor is removed carbon dioxide is also carried away. Loss of gaseous carbon dioxide from the solution stream results from decomposing the sodium bicarbonate to sodium carbonate according to the following chemical reaction: 
$2NaHCO_3 \rightarrow Na_2CO_3 + H_2O + CO_2 \uparrow$ This is a benefit to the overall process since less residual sodium bicarbonate is required to be neutralized or otherwise removed in the subsequent bicarbonate conversion step of this invention.

The concentration or fortification of the aqueous minewater stream, e.g., by evaporation or as otherwise described, is desirably sufficient to provide a concentration of at least about 18 wt % sodium carbonate, and more preferably at least about 20 wt % sodium carbonate, in the concentrated stream introduced to the first crystallizer operation.

When evaporation is the concentration means and is carried out at high evaporation temperatures, e.g., at least 100° C. or higher, even greater concentrations of sodium carbonate are feasible, e.g., at least about 25 wt % $Na_2CO_3$, are possible in the evaporation step. Referring to FIG. 1, evaporation of water from the aqueous minewater stream, along with decomposition of bicarbonate, moves its composition towards the region indicated by point D in FIG. 1. This composition endpoint has been found applicable for a range of initial minewater effluent stream compositions.

In FIG. 1, the region around point D is a preferred composition for the evaporated minewater stream since it provides a concentrated solution suitable for crystallizing sodium sesquicarbonate by cooling. Crystallization of sodium sesquicarbonate reduces the amount of bicarbonate which must be converted to carbonate prior to crystallizing sodium carbonate monohydrate in the second crystallizer operation.

Recycle of a portion of the first crystallizer mother liquor to the evaporation step may also be implemented, as a means for further concentrating the crystallizer feed stream via evaporation and maintaining the composition in the first crystallizer operation within the sodium sesquicarbonate region of the phase diagram. An advantage of recycling crystallizer mother liquor is that additional water can be evaporated from the combined streams without prematurely reaching a saturation concentration in the evaporated stream.

A preferred aspect of the invention involves evaporating sufficient water from the withdrawn aqueous minewater stream and recycled mother liquor, prior to their introduction into the first crystallizer operation, to yield an aqueous stream from the evaporator containing at least about 24 wt % sodium carbonate.

The Examples in this disclosure illustrate various approaches for operating the first crystallizer to effect crystallization of sodium sesquicarbonate alone as the sole stable solid species.

Another option for producing a more concentrated sesquicarbonate crystallizer feed is by fortifying the aqueous solution mining effluent stream via the addition of dry-mined crushed trona ore or sodium sesquicarbonate to the aqueous stream. As mentioned previously, this fortification approach does not contemplate or include the addition of calcined trona ore or of calcined sodium sesquicarbonate, i.e., crude sodium carbonate calcinate.

The first crystallizer operation may be operated in the manner as conventional sodium sesquicarbonate crystallizers which are described in the prior art. Cooling crystallizers are preferred for the first crystallizer operation, to crystallize sodium sesquicarbonate, and are well known for use in crystallizing sodium sesquicarbonate.

Such crystallizers facilitate crystallization of sodium sesquicarbonate at the lower crystallization temperatures normally used for sesquicarbonate crystallization, preferably within the range of about from about 25° C. to about 45° C., and more preferably about 30° C. to about 40° C.

Evaporative crystallizers, which are well known for use in soda ash production, may also be used in the first crystallizer operation, for crystallizing sodium sesquicarbonate.

Combinations of evaporative and cooling crystallizers may also be employed, to achieve crystallization of the desired sodium sesquicarbonate in the first crystallizer operation.

The crystalline sodium sesquicarbonate formed in the first crystallizer operation is substantially free of other crystalline species, i.e., there is no significant co-crystallization of other alkali crystal species such as sodium carbonate monohydrate or the like and the crystal slurry is essentially free of crystal species other than sodium sesquicarbonate. In other words, the crystallizer slurry in the first crystallizer operation contains less than about 1 wt % co-crystallized species that are not sodium sesquicarbonate.

The crystalline sodium sesquicarbonate formed in the first crystallizer operation is recovered by conventional means. Crystallizer slurry is withdrawn from the crystallizer and processed via conventional solids-liquid separation techniques, e.g., centrifugation or filtration, to separate the crystalline sodium sesquicarbonate as a first product from the crystallizer mother liquor. The separated centrifuge cake or filter cake may be washed, e.g., with water, to reduce the level of impurities from mother liquor remaining in the damp cake.

The recovered crystalline sodium sesquicarbonate may be dried and then marketed or used per se as a commercial product. Sodium sesquicarbonate is commercially useful as an animal feed supplement with pH buffering properties or in flue gas desulfurization, for removal of sulfur dioxide from waste gas streams.

The recovered crystalline sodium sesquicarbonate may alternatively be converted to soda ash by calcination at elevated temperature, e.g., about 150° C. to about 550° C. in a conventional calciner, e.g., a rotary calciner or fluid bed calciner. The resulting sodium carbonate (soda ash) is a dry, free-flowing solid powder, a commercial soda ash product that is usually referred to as light soda ash. Light soda ash is relatively porous and finds use in detergent formulations for its absorptive properties.

The crystallizer mother liquor remaining after recovery of the crystalline sodium sesquicarbonate is next treated, in the process of this invention, to remove at least a portion of the sodium bicarbonate dissolved therein. A portion of the mother liquor, as described above, may also be recycled upstream and combined with the aqueous solution mining effluent stream prior to the latter's being concentrated or fortified.

Bicarbonate Conversion—Neutralization Step

The process of this invention utilizes the mother liquor stream from the first crystallizer operation, to recover additional sodium carbonate values as sodium carbonate monohydrate, in a second crystallizer operation.

The feed stream introduced to the second crystallizer operation must be treated to convert at least a portion of residual dissolved sodium bicarbonate in the separated first crystallizer mother liquor to carbonate, in a treatment sufficient to permit crystallization of sodium carbonate monohydrate from the treated first crystallizer mother liquor as the sole crystalline species.

Several approaches may be used to effect conversion of sodium bicarbonate in the first crystallizer mother liquor to carbonate.

The preferred conversion method is neutralization of sodium bicarbonate to carbonate, using a neutralizing agent. The neutralizing agent is preferably selected from the group consisting of lime (calcium oxide, CaO), slaked lime (calcium hydroxide, $Ca(OH)_2$), and caustic soda (sodium hydroxide, NaOH). Caustic soda (sodium hydroxide) may be made via a causticizing operation using lime, as described below, or generated via electrolysis of carbonate\bicarbonate or sodium chloride solutions, or simply purchased in bulk.

The conversion of sodium bicarbonate to carbonate in the feed stream introduced to the second crystallizer operation should reduce the concentration of sodium bicarbonate to low levels. The conversion of sodium bicarbonate in the aqueous first crystallizer mother liquor used as feed to the second crystallizer operation should be sufficient to permit crystallization of sodium carbonate monohydrate from feed stream as the sole crystalline species. Although sodium carbonate monohydrate can be crystallized from aqueous sodium carbonate solutions containing as much as 4 wt % $NaHCO_3$, the conversion of bicarbonate is preferably sufficient to reduce the residual bicarbonate concentration to less than about 1 wt % $NaHCO_3$ and more preferably to less than about 0.5 wt % $NaHCO_3$, in the sodium carbonate monohydrate crystallizer mother liquor. These low levels of sodium bicarbonate in the feed stream introduced into the second crystallizer are required to ensure that sodium carbonate monohydrate is the sole stable solid phase being crystallized in the second crystallizer operation.

The first crystallizer operation, in some circumstances, may be operated in such a manner as to yield a first crystallizer mother liquor having a relatively low concentration of sodium bicarbonate, e.g., greater than about 0.5 wt % $NaHCO_3$ up to about 1.5 wt % $NaHCO_3$. In such cases, it may be desirable in the process of this invention to carry out the conversion of residual sodium bicarbonate present in the first crystallizer mother liquor in a treatment that occurs concurrently with the second crystallization operation. For example, the first crystallizer mother liquor, having a low bicarbonate concentration, may be fed directly to the second crystallizer operation. The second crystallization operation is then carried out in a manner that effects thermal decomposition of the residual sodium bicarbonate to carbonate, while also crystallizing sodium carbonate monohydrate.

In other operating modes for the first crystallizer operation, the treatment of the first crystallizer mother liquor is carried out as a separate step, e.g., in which at least a portion of the residual bicarbonate in the first crystallizer mother liquor is subjected to a neutralization treatment using a neutralizing agent.

The term "neutralization" as used in this disclosure refers to the chemical conversion of sodium bicarbonate to carbonate, using a neutralizing agent, e.g., lime or caustic soda. Sufficient neutralizing agent should be employed in the neutralization step to achieve the endpoint sodium bicarbonate concentrations discussed above. It should be noted that where neutralization of essentially all residual sodium bicarbonate is the objective, there may be small concentrations of sodium hydroxide, e.g., up to about 0.5 wt % NaOH, present in the treated solution introduced to the second crystallizer operation.

The neutralization step may be carried out via use of a lime causticization step, using aqueous solution from any of several sources. A portion of the first crystallizer mother liquor may be diverted to a lime causticizer operation; such mother liquor may be used either with or without a preliminary steam stripping step at elevated temperature, e.g., at least about 100° C., to thermally decompose additional bicarbonate present in the stream. Alternatively, a portion of the aqueous solution mining effluent stream may be diverted to the causticizer step, preferably with an optional preliminary steam stripping step to remove bicarbonate present in the stream. Other sources of aqueous solution for the causticization step include waste streams that may be available at the process site.

A preferred source of the causticizer solution is first crystallizer mother liquor, a portion of which is diverted to the causticizer, since this aqueous solution source typically requires less lime neutralizing agent than other solutions containing higher bicarbonate concentrations.

The overall, simplified reactions taking place in the causticizing step using lime is as follows:

$$CaO+2NaHCO_3 \rightarrow CaCO_3+Na_2CO_3+H_2O \qquad \text{i)}$$

$$CaO+Na_2CO_3+H_2O \rightarrow CaCO_3+2NaOH \qquad \text{ii)}$$

The simplified reaction taking place in the bicarbonate neutralization step using sodium hydroxide (caustic soda) is as follows:

$$NaOH+NaHCO_3O \rightarrow Na_2CO_3+H_2O \qquad \text{iii)}$$

As is clear from reaction (ii) above, one mole of lime (CaO) is reacted with each mole of sodium carbonate in the aqueous stream fed to the causticizing unit to produce two moles of sodium hydroxide. Overall lime usage is reduced by use of aqueous streams having reduced concentrations of sodium bicarbonate, since sodium bicarbonate also requires lime for its conversion to carbonate, as shown in reaction (i) above, before it can be reacted to form sodium hydroxide via reaction (ii).

Causticization is preferably carried out at elevated temperatures, of about 70° C. to about 100° C., and this is facilitated by the exothermic nature of the reactions. The hot aqueous caustic solution that results from the causticization step is dilute and typically has a concentration of about 1 wt % to about 12 wt % NaOH.

After neutralizing the first crystallizer mother liquor, the neutralized mother liquor may be optionally clarified and/or filtered to remove any remaining insoluble materials from the lime slaking and/or causticization steps including grits, unreacted lime and calcium carbonate, collectively referred to as "lime muds," if these have not already been removed in the previous steps.

Steam stripping or evaporation of the aqueous first crystallizer mother liquor at elevated temperature or both are alternative means for effecting conversion of sodium bicarbonate to carbonate. These procedures result in the thermal decomposition of sodium bicarbonate, with the evolution of $CO_2$ gas as a decomposition byproduct. These steps may be used in conjunction with a neutralization step, as described above, and have the advantage of further reducing the amount of neutralizing agent required in the overall process.

Evaporation of water from the aqueous first crystallizer mother liquor stream at elevated temperature typically results in the decomposition of sodium bicarbonate in the aqueous stream. The carbon dioxide vapor pressure above the solution increases at elevated temperature and, as water vapor is removed, carbon dioxide is also carried away. Loss of gaseous carbon dioxide from the solution stream results in sodium bicarbonate decomposing to sodium carbonate according to the following chemical reaction: $2NaHCO_3 \rightarrow Na_2CO_3 + H_2O + CO_2\uparrow$ Steam stripping of the first crystallizer mother liquor also results in decomposition of sodium bicarbonate by the reaction shown above. Steam stripping of the aqueous first crystallizer mother liquor is normally carried out in a countercurrent flow column, with steam introduced at the bottom and water vapor and gaseous carbon dioxide exiting at the top, at (solution) operating temperatures of about 90° C. to about 170° C., and more preferably above about 100° C. and up to about 150° C. The carbon dioxide byproduct may optionally be recovered from the exit gas stream, for uses well known in the art.

Steam stripping to decompose sodium bicarbonate does not normally result in significant evaporation of water. The total alkali concentration of the stream-stripped solution exiting the column is usually similar to that of the solution fed to the column, with the bicarbonate concentration being reduced and the carbonate levels being increased.

The resulting neutralized or otherwise treated first crystallizer mother liquor stream is essentially a concentrated sodium carbonate solution, and this concentrated solution is then used as the feed to the second crystallizer operation where sodium carbonate monohydrate is crystallized and recovered.

Second Crystallizer Operation (Monohydrate Crystallization)

The process of this invention involves a second crystallizer operation, in which sodium carbonate monohydrate is crystallized, as the sole stable crystal phase, from aqueous mother liquor from the first crystallizer operation.

As described above, the first crystallizer mother liquor is treated to reduce the content of residual sodium bicarbonate, to ensure that the second crystallizer operation yields sodium carbonate monohydrate as the desired crystalline species, without significant co-crystallization of sodium sesquicarbonate.

The aqueous feed stream introduced to the second crystallizer operation preferably has a sodium carbonate concentration of at least about 22 wt % $Na_2CO_3$, more preferably at least about 24 wt % $Na_2CO_3$, up to a maximum of about 30 wt % $Na_2CO_3$. The sodium bicarbonate concentration in the aqueous feed stream is preferably at a level of not more than about 1 wt % $NaHCO_3$ and more preferably at a level of not more than about 0.5 wt % $NaHCO_3$.

The feed stream introduced to the second crystallizer operation in the process of this invention is substantially free of added crude sodium carbonate calcinate, obtained either from calcination of dry mined trona ore or from calcination of sodium sesquicarbonate.

The second crystallizer operation may be operated in the manner as conventional sodium carbonate monohydrate crystallizers which are described in the prior art. The second crystallizer operation is preferably operated using an evaporative crystallizer, at temperatures of at least about 60° C. to not more than about 110° C., for crystallization of sodium carbonate monohydrate and evaporation of water from the crystallizer slurry.

The second crystallizer operation may be carried out using multiple-effect evaporators or more preferably using a vapor recompression evaporator.

In a multiple-effect evaporator, the liquor temperature varies from effect to effect with much of the evaporation taking place at temperatures below 100° C. Although some thermal decomposition of sodium bicarbonate can occur in a multiple-effect evaporator, such bicarbonate decomposition is not significant below 100° C. In a multiple-effect evaporator, the concentration of sodium bicarbonate in the feed stream introduced to the second crystallizer operation is preferably maintained below about 0.5 wt %, to avoid the unwanted co-crystallization of sodium sesquicarbonate along with the desired crystalline carbonate monohydrate.

In a second crystallizer operation that utilizes a mechanical vapor recompression evaporator, generally all of the feed stream introduced to the crystallizer operation is subjected to temperatures above about 100° C. At these higher operating temperatures, feed streams containing slightly higher sodium bicarbonate concentrations, e.g., up to about 1 wt % sodium bicarbonate, may be accommodated in a second crystallizer operation using mechanical vapor recompression evaporators.

One aspect of the present invention, in which the sodium bicarbonate conversion is carried out concurrently with crystallization of the sodium carbonate monohydrate in the second crystallizer operation, takes advantage of low concentrations of sodium bicarbonate being present in the first crystallizer mother liquor and the thermal decomposition being able to convert such small amounts of bicarbonate to carbonate at elevated temperatures. In this embodiment of the invention, thermal decomposition of the sodium bicarbonate in the liquor in the second crystallizer is carried out in conjunction with the second crystallizer operation.

The crystalline sodium carbonate monohydrate formed in the second crystallizer operation is substantially free of other crystalline species, i.e., there is no significant co-crystallization of sodium sesquicarbonate or the like and the crystal slurry is essentially free of crystal species other than sodium carbonate monohydrate. In other words, the crystallizer slurry in the second crystallizer operation contains is less than about 1 wt % co-crystallized sodium sesquicarbonate or other alkali species that are not sodium carbonate monohydrate.

The crystalline sodium carbonate monohydrate formed in the second crystallizer operation is recovered by conventional means. Crystallizer slurry is withdrawn from the second crystallizer and processed via conventional solids-liquid separation techniques, e.g., centrifugation or filtration, to separate the crystalline sodium carbonate monohydrate from the crystallizer mother liquor. The separated centrifuge cake or filter cake may be washed, e.g., with water, to reduce the level of impurities from mother liquor remaining in the damp cake.

The separated crystalline sodium carbonate monohydrate is then dried to effect dehydration of the water of hydration and to convert the monohydrate crystals to sodium carbonate (soda ash). The drying operation is carried out at elevated temperatures, e.g., about 115° C. up to about 160° C., in a conventional fluid bed or rotary dryer. Soda ash obtained from drying crystalline sodium carbonate monohydrate is a dry, free-flowing solid that exhibits a high bulk density and that is usually referred to as dense soda ash. Such dense soda ash is particularly useful in the manufacture of glass, among many other uses.

Mother liquor from the second crystallizer operation, after separation and recovery of the crystalline sodium carbonate monohydrate from the withdrawn crystal slurry, may be recycled to the second crystallizer operation. As is common practice, a portion of the recycled mother liquor may be purged from the system to control the buildup of impurities in the second crystallizer operation, which could otherwise adversely affect crystal quality.

Alternatively, mother liquor from the second crystallizer operation may be used in other ways, for its residual sodium carbonate values, as is generally known in the art.

EXAMPLES

Example 1

Example 1 illustrates one aspect of the process of this invention in which sodium sesquicarbonate and sodium carbonate monohydrate are produced from an aqueous minewater effluent stream that is at ambient temperature, 18° C. In this Example 1, the two products are processed further to make soda ash (sodium carbonate), the sodium sesquicarbonate being calcined to make light soda ash and the sodium carbonate monohydrate being dried to make dense soda ash. The Example describes a continuously-operated process in which the annual output is 100,000 tons ($2 \times 10^8$ lbs) soda ash per year.

As will be shown in the detailed description that follows, the process of this Example 1 is noteworthy for the following:
  58% of the total soda ash output is light soda ash, from calcined sodium sesquicarbonate, and 42% is dense soda ash, from sodium carbonate monohydrate
  total alkali (sodium carbonate) recovery from the aqueous minewater feed stream is high, about 89%
  aqueous minewater effluent is concentrated, in a preliminary evaporation step, prior to the crystallization of sodium sesquicarbonate in a cooling crystallizer operation
  sodium sesquicarbonate crystallizer mother liquor is recycled to the evaporation step
  sodium sesquicarbonate crystallization occurs with a crystallizer composition that is on the right side of the phase diagram within the sesquicarbonate region
  lime usage in the neutralization is relatively low, about 810 tons/year.
    lime usage in a minewater-based process, producing only sodium carbonate monohydrate without any initial crystallization of sodium sesquicarbonate, could easily consume about ten times as much lime, for the same annual soda ash output
  caustic soda used in the neutralization step is made by reacting lime with aqueous minewater.

Figure 3:
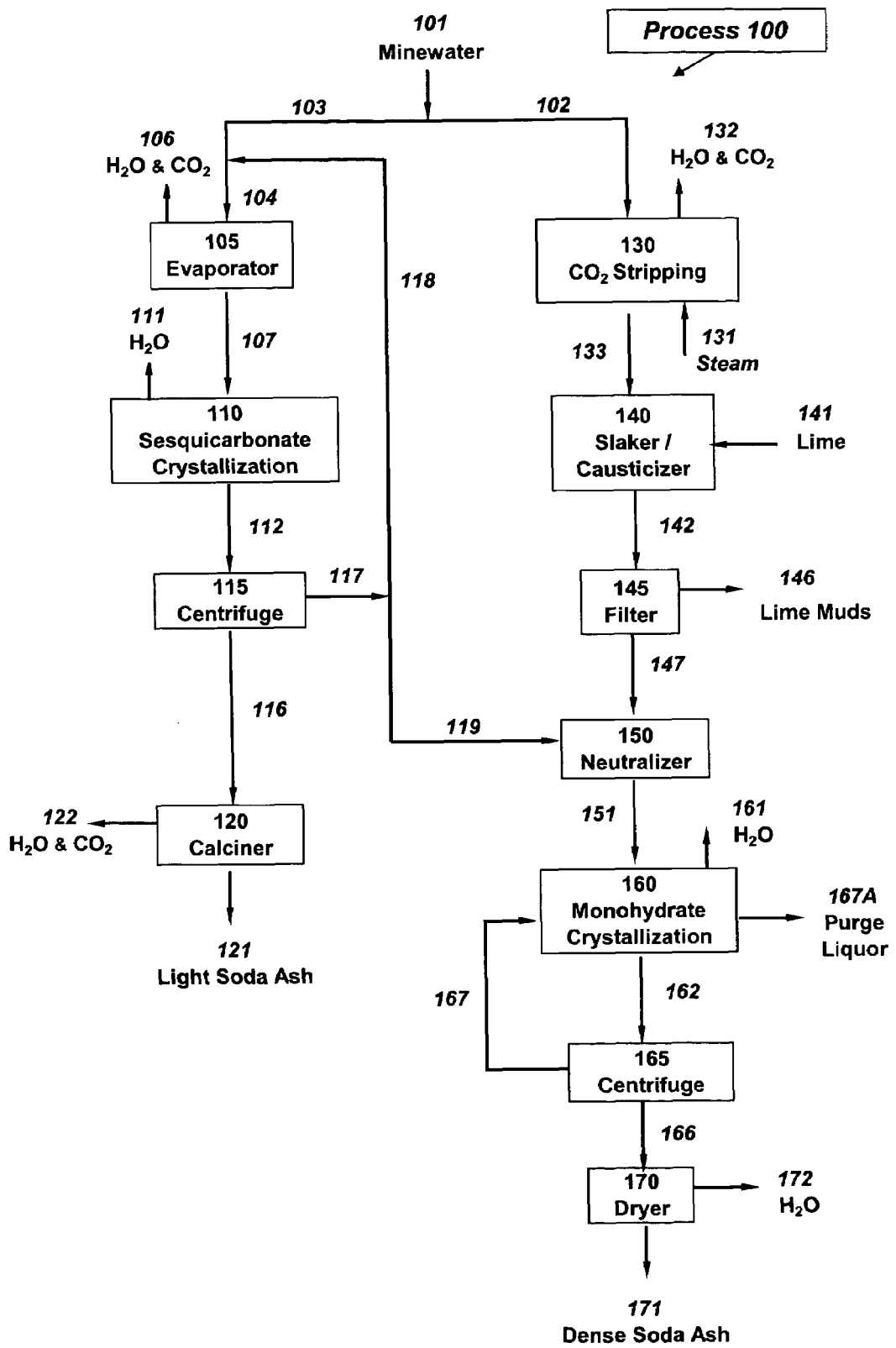
FIG. 3 is a schematic flow diagram showing the steps and operations in producing sodium sesquicarbonate and sodium carbonate monohydrate in one embodiment of the process of this invention, discussed in Examples 1 and 2.

The process of Example 1 is best understood by reference to the schematic flow diagram shown in FIG. 3, which depicts one aspect of the process 100 of this invention. Details of the process of Example 1 are as follows, referring now to FIG. 3.

The process 100 employs as a feed stream 101, an aqueous minewater stream at a temperature of 18° C. having a composition as follows: 12.7 wt % $Na_2CO_3$, 4.6 wt % $NaHCO_3$ and about 0.5 wt % NaCl. This aqueous minewater stream 101 has a total alkali value of 15.6 wt % TA, is saturated at about 18° C., and is introduced into the process 100 at a flow rate of about 310 gallons/min. About 5% of this stream 101 is diverted, as stream 102, for use in the causticization step 140, as described below, with the balance 103 of the stream being directed to an evaporator 105.

The aqueous minewater stream 103 is combined with a portion of crystallizer mother liquor 118 from the sesquicarbonate crystallizer operation 110, being recycled at a rate sufficient to yield a combined stream 104 containing 19.7 wt % $Na_2CO_3$, 2.8 wt % $NaHCO_3$ and about 1 wt % NaCl. Stream 104 is introduced into the evaporator 105, operated at a temperature of about 100° C. The exit gas stream 106 from the evaporator 105 removes water from the evaporator combined feed stream 104.

The evaporated aqueous feed stream 107 exiting from the evaporator 105 contains 27.2 wt % $Na_2CO_3$ and 3.8 wt % $NaHCO_3$, and is introduced at a rate of about 370 gallons/min into the first crystallizer operation 110, a cooling crystallizer operated at about 40° C. Sodium sesquicarbonate is crystallized in the crystallizer 110, with no other crystal species being co-crystallized, and water is removed from the crystallizer 110 as stream 111. Crystallizer slurry 112 is removed from the crystallizer and is passed to a centrifuge 115 where the slurry is separated, yielding a damp centrifuge cake 116 and crystallizer mother liquor 117. The centrifuge cake 116, containing about 6 wt % liquor, is passed to a calciner 120, operated at a temperature between about 150° C. to 350° C., to yield a dry, free-flowing soda ash product 121, light soda ash, produced at a rate of about 14,700 lb/hr. The calciner 120 also vents a gas stream 122 containing water and carbon dioxide from the calcination of the crystalline sodium sesquicarbonate 116 to light soda ash 121.

The first crystallizer mother liquor stream 117 contains 27.9 wt % $Na_2CO_3$, 0.6 wt % $NaHCO_3$ and about 2 wt % NaCl. The stream 117 is split into one portion 118, about 77% of the total stream 117, that is recycled to the evaporator 105 and combined with the aqueous minewater stream 103, as described above. The diverted remainder 119 of the mother liquor stream 117 is introduced to the neutralizer 150.

Caustic soda is prepared for the neutralization operation 150, as follows. The diverted portion 102 of aqueous minewater stream 101, having the same composition as the main minewater feed stream 101, is introduced into a carbon dioxide stripping column 130. Steam 131 is introduced into the column 130, operated at temperatures between about 100° C. to 150° C., to decompose about 25% of the bicarbonate content of the stream 102, with a gas stream 132 venting water and carbon dioxide from the top of the column 130. The minewater liquor exit stream 133 exiting from the bottom of the column 130 contains 13.4 wt % $Na_2CO_3$, 3.4 wt % $NaHCO_3$ and about 0.5 wt % NaCl, and is next introduced into a lime slaker/causticizer 140.

Lime 141 is also introduced into the lime slaker/causticizer 140, at a rate of about 200 lb/hr, to react with the alkali in the minewater liquor exit stream 133 and produce dilute caustic soda (sodium hydroxide) 142. The caustic soda stream 142 is removed from the causticizer 140, passed to a filter 145 to remove lime muds ($CaCO_3$ and nonreactive CaO) 146. The resulting filtered, dilute caustic soda stream 147 contains 1.4 wt % NaOH, 14.0 wt % $Na_2CO_3$ and about 0.5 wt % NaCl, and this stream 147 is fed to the neutralizer 150.

The diverted first crystallizer mother liquor stream 119 and dilute caustic soda stream 147 are reacted in the neutralizer 150 to yield neutralized liquor 151 that is low in bicarbonate content.

The neutralized liquor 151, removed from the neutralizer 150, has a composition containing 26.4 wt % $Na_2CO_3$, 0.05 wt % $NaHCO_3$ and about 2 wt % NaCl. The neutralized liquor stream 151 is introduced into the second crystallizer operation 160 at a rate of about 80 gallons/min. In the crystallizer 160, sodium carbonate monohydrate is crystallized as the sole crystalline species, at temperatures of about 75° C. to 100° C.

In the crystallization operation, water 161 is removed from the crystallizer 160 to crystallize sodium carbonate monohydrate. Crystallizer slurry 162 is removed from the crystallizer 160 and is passed to a centrifuge 165 where the slurry 162 is separated, yielding a damp centrifuge cake 166 and crystallizer mother liquor 167. The centrifuge cake 166, containing crystalline sodium carbonate monohydrate and about 6 wt % liquor, is passed to a dryer 170, operated at a temperature of about 115-160° C., to yield a dry, free-flowing dense soda ash product 171, at a rate of about 10,400 lb/hr. The dryer 170 also vents a gas stream 172 containing water, from the hydrated water removed during drying from the sodium carbonate monohydrate and residual moisture in the centrifuge cake 166.

The separated crystallizer mother liquor 167, containing 25.0 wt % $Na_2CO_3$, 0.2 wt % $NaHCO_3$ and about 7 wt % NaCl, is recycled to the crystallizer 160. A liquor purge stream, substantially free of crystallized solids, is removed from the crystallizer 160 as stream 167A.

Example 2

Example 2 illustrates another aspect of the process of this invention, similar to that of Example 1, to demonstrate that the process is readily adapted for use with an aqueous minewater effluent stream that has an elevated temperature, 60° C., instead of ambient temperature, 18° C., used in Example 1.

In other respects, the parameters of this Example 2 are similar to that of Example 1. The sodium sesquicarbonate and sodium carbonate monohydrate crystallization products are processed further to make soda ash, in a continuous process having an annual output of 100,000 tons soda ash per year. In addition, the aqueous minewater effluent is again concentrated in a preliminary evaporation step, the sodium sesquicarbonate is again produced in a cooling crystallizer, at a crystallizer composition that is on the right side of the sesquicarbonate region of the phase diagram, and some of the sesquicarbonate mother liquor is recycled to the evaporation step. Minewater is again reacted with lime to make the caustic soda used in the neutralization step This Example 2 is noteworthy for the following:
  68% of the total soda ash output is light ash, from calcined sodium sesquicarbonate, and 32% is dense ash, from sodium carbonate monohydrate
  total alkali (sodium carbonate) recovery from the aqueous minewater feed stream is again high, about 91%
  lime usage in the neutralization step is again relatively low, about 920 tons/year
  the percentage of total production derived from light ash is increased, e.g., as market conditions warrant, by recycling a significant portion of the sodium sesquicarbonate crystallizer mother liquor.

The process of Example 2 may be understood by reference to the schematic flow diagram shown in FIG. 3, which depicts the process 100 of this invention. Details of the process of Example 2 are as follows, referring now to FIG. 3.

The process 100 of Example 2 employs as a feed stream 101, an aqueous minewater stream at a temperature of 60° C. having a composition as follows: 12.7 wt % $Na_2CO_3$, 8.5 wt % $NaHCO_3$ and about 0.5 wt % NaCl. This aqueous minewater stream 101 has a total alkali value of 18.0 wt % TA, is saturated at 60° C., and is introduced into the process 100 at a flow rate of about 260 gallons/min. About 4% of this stream 101 is diverted, as stream 102, for use in the causticization step 140, as described below, with the balance 103 of the stream being directed to an evaporator 105.

The aqueous minewater stream 103 is combined with a portion of crystallizer mother liquor 118 from the sesquicarbonate crystallizer operation 110, being recycled at a rate sufficient to yield a combined stream 104 containing 20.8 wt % $Na_2CO_3$, 4.2 wt % $NaHCO_3$ and about 1 wt % NaCl. Stream 104 is introduced into the evaporator 105, operated at an elevated temperature of about 120° C. The exit gas stream 106 from the evaporator 105 removes both water and carbon dioxide (from bicarbonate decomposition) from the combined feed stream 104.

The evaporated aqueous feed stream 107 from the evaporator 105 contains 26.8 wt % $Na_2CO_3$ and 3.9 wt % $NaHCO_3$ and is introduced at a rate of about 420 gallons/min into the first crystallizer operation 110, a cooling crystallizer operated at about 40° C. Sodium sesquicarbonate is crystallized in the crystallizer 110, with no other crystal species being co-crystallized, and water is removed from the crystallizer 110 as stream 111. Crystallizer slurry 112 is removed from the crystallizer and is passed to a centrifuge 115 where the slurry is separated, yielding a damp centrifuge cake 116 and crystallizer mother liquor 117. The centrifuge cake 116, containing about 6 wt % liquor, is passed to a calciner 120, operated at a temperature between about 150° C. to 350° C., to yield a dry, free-flowing soda ash product 121, light soda ash, produced at a rate of about 17,100 lb/hr. The calciner 120 also vents a gas stream 122 containing water and carbon dioxide from the calcination of the crystalline sodium sesquicarbonate 116 to light soda ash 121.

The first crystallizer mother liquor stream 117 contains 27.4 wt % $Na_2CO_3$, 0.6 wt % $NaHCO_3$ and about 2 wt % NaCl. The stream 117 is split into one portion 118, about 84% of the total stream 117, that is recycled to the evaporator 105 and combined with the aqueous minewater stream 107, as described above. The diverted remainder 119 of the mother liquor stream 117 is introduced to the neutralizer 150.

Caustic soda is prepared for the neutralization operation 150, as follows. The diverted portion 102 of aqueous minewater stream 101, having the same composition as the main minewater feed stream 101, is introduced into a carbon dioxide stripping column 130. Steam 131 is introduced into the column 130, operated at temperatures between about 100° C. to 150° C., to decompose about 25% of the bicarbonate content of the stream 102, with a gas stream 132 venting water and carbon dioxide from the top of the column 130. The minewater liquor exit stream 133 exiting from the bottom of the column 130 contains 14.1 wt % $Na_2CO_3$, 6.4 wt % $NaHCO_3$ and about 0.5 wt % NaCl and is next introduced into a lime slaker/causticizer 140.

Lime 141 is also introduced into the lime slaker/causticizer 140, at a rate of about 230 lb/hr, to react with the alkali in the minewater liquor exit stream 133 and produce dilute caustic soda (sodium hydroxide) 142. The caustic soda stream 142 is removed from the causticizer 140, passed to a filter 145 to remove lime muds ($CaCO_3$ and nonreactive CaO) 146. The resulting filtered, dilute caustic soda stream 147 contains 1.7 wt % NaOH, 16.4 wt % Na$_2$CO$_3$ and about 0.5 wt % NaCl, and this stream 147 is fed to the neutralizer 150.

The diverted first crystallizer mother liquor stream 119 and dilute caustic soda stream 147 are reacted in the neutralizer 150 to yield neutralized liquor 151 that is low in bicarbonate content. The neutralized liquor 151, removed from the neutralizer 150, has a composition containing 26.5 wt % Na$_2$CO$_3$, 0.06 wt % NaHCO$_3$ and about 2 wt % NaCl. The neutralized liquor stream 151 is introduced into the second crystallizer operation 160 at a rate of about 60 gallons/min. In the crystallizer 160, sodium carbonate monohydrate is crystallized as the sole crystalline species, at temperatures of about 75° C. to 100° C.

In the crystallization operation, water 161 is removed from the crystallizer 160 to crystallize sodium carbonate monohydrate. Crystallizer slurry 162 is removed from the crystallizer 160 and is passed to a centrifuge 165 where the slurry 162 is separated, yielding a damp centrifuge cake 166 and crystallizer mother liquor 167. The centrifuge cake 166, containing crystalline sodium carbonate monohydrate and about 6 wt % liquor, is passed to a dryer 170, operated at a temperature of about 115-160° C., to yield a dry, free-flowing soda ash product 171, dense soda ash, produced at a rate of about 8000 lb/hr. The dryer 170 also vents a gas stream 172 containing water, from the hydrated water removed during drying from the sodium carbonate monohydrate and residual moisture in the centrifuge cake 166.

The separated crystallizer mother liquor 167, containing 25.0 wt % Na$_2$CO$_3$, 0.2 wt % NaHCO$_3$ and about 7 wt % NaCl, is recycled to the crystallizer 160. A liquor purge stream, substantially free of crystallized solids, is removed from the crystallizer 160 as stream 167A.

Example 3

Example 3 illustrates yet another aspect of the process of this invention, in which the sodium sesquicarbonate crystallization operation is modified to reduce the overall percentage soda ash that is light density soda ash, significantly raising production of dense soda ash, from sodium carbonate monohydrate. This Example 3 uses the same aqueous minewater effluent stream that is used in Example 1, at ambient temperature, 18° C.

The parameters of this Example 3 are similar to that of Example 1 in the following respects. The sodium sesquicarbonate and sodium carbonate monohydrate crystallization products are processed further to make soda ash, in a continuous process having an annual output of 100,000 tons soda ash per year. In addition, the aqueous minewater effluent is again concentrated in a preliminary evaporation step, and the sodium sesquicarbonate is again produced in a cooling crystallizer operation.

Noteworthy aspects and significant differences in this Example 3 from the previous examples include the following:
  in the overall soda ash production, the percentage of dense soda ash, from sodium carbonate monohydrate, is significantly higher, as compared with the first two examples:
    60% of the total soda ash output is dense soda ash and only 40% is light ash, from calcined sodium sesquicarbonate
  total alkali (sodium carbonate) recovery from the aqueous minewater feed stream is still high, about 89%
  liquor is processed on a once-through basis in the sodium sesquicarbonate crystallization portion of the process; there is no recycle of sesquicarbonate crystallizer mother liquor
  sodium sesquicarbonate crystallization occurs at a crystallizer composition on the left side of the phase diagram within the sesquicarbonate region, not the right side as in the first two examples
  mother liquor from the sodium sesquicarbonate crystallizer operation is subjected to steam stripping and evaporation steps, to decompose sodium bicarbonate into carbonate, before residual sodium bicarbonate in the stream is neutralized with caustic soda
  caustic soda used in the neutralization step is made by reaction of lime with mother liquor from the sodium sesquicarbonate crystallization operation, rather than with aqueous minewater effluent as in the previous examples
  lime usage in the neutralization step is about 2740 tons/year, higher than that in the first two examples, because of the higher volume of sodium carbonate monohydrate being produced.

Figure 4:
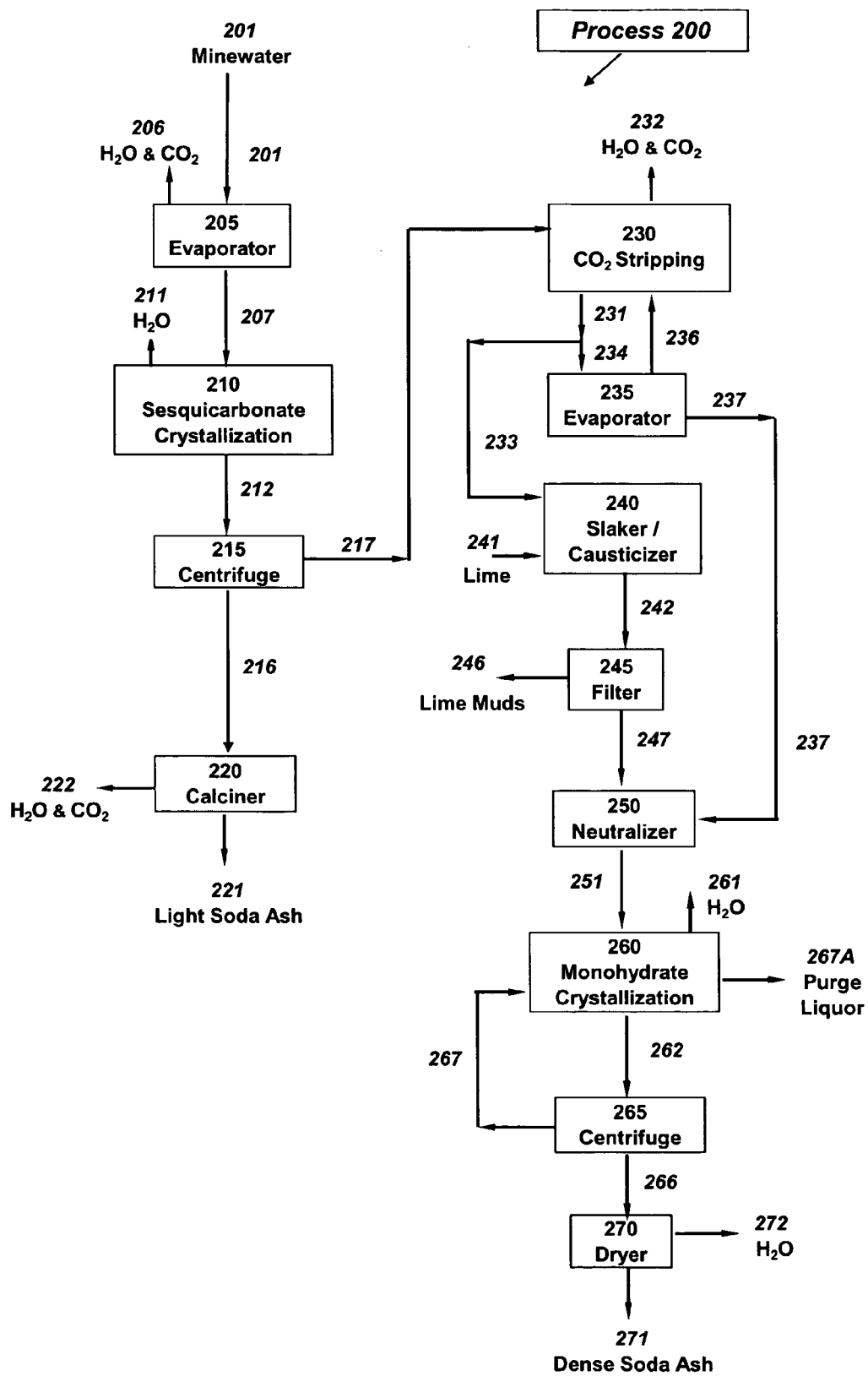
FIG. 4 is a schematic flow diagram showing the steps and operations in producing sodium sesquicarbonate and sodium carbonate monohydrate in another embodiment of the process of this invention, discussed in Examples 3 and 4.

The process of Example 3 may be understood by reference to the schematic flow diagram shown in FIG. 4, which depicts process 200 of this invention. Details of the process of Example 3 are as follows, referring now to FIG. 4.

The process 200 of Example 3 employs as a feed stream 201, an aqueous minewater stream at a temperature of 18° C. having a composition as follows: 12.7 wt % Na$_2$CO$_3$, 4.6 wt % NaHCO$_3$ and about 0.5 wt % NaCl. This aqueous minewater stream 201 has a total alkali value of 15.6 wt % TA, is saturated at 18° C., and is introduced into the process 200 at a flow rate of about 310 gallons/min.

This aqueous minewater stream 201 is introduced into an evaporator 205 that is operated at a temperature of about 100° C., and the exit gas stream 206 removes water from the stream 201.

The evaporated aqueous feed stream 207 exiting from the evaporator 205 contains 20.8 wt % Na$_2$CO$_3$ and 7.5 wt % NaHCO$_3$ and is introduced at a rate of about 180 gallons/min into the first crystallizer operation 210, a cooling crystallizer operated at about 40° C. Sodium sesquicarbonate is crystallized in the crystallizer 210, with no other crystal species being co-crystallized. In the crystallization operation, water 211 is removed from the crystallizer 210. Crystallizer slurry 212 is removed from the crystallizer and is passed to a centrifuge 215 where the slurry is separated, yielding a damp centrifuge cake 216 and crystallizer mother liquor 217. The centrifuge cake 216, containing about 6 wt % liquor, is passed to a calciner 220, operated at a temperature between about 150° C. to 350° C., to yield a dry, free-flowing soda ash product 221, light soda ash, produced at a rate of about 10,100 lb/hr. The calciner 220 also vents a gas stream 222 containing water and carbon dioxide from the calcination of the crystalline sodium sesquicarbonate 216 to light soda ash 221.

The crystallizer mother liquor 217 is directed to a carbon dioxide stripping column 230 and an evaporator 235 to decompose a portion of sodium bicarbonate in the mother liquor stream 217. The crystallizer mother liquor stream 217 is introduced into the carbon dioxide stripping column 230. A hot vapor stream 236 exiting from the downstream evaporator 235 is introduced into the column 230, operated at temperatures between about 100° C. to 150° C., to decompose about 25% of the bicarbonate content of the stream 217.

The aqueous stream 231 removed from the carbon dioxide stripping column 230 contains 19.5 wt % Na$_2$CO$_3$, 2.6 wt % NaHCO$_3$ and about 1 wt % NaCl. The water vapor stream 232 exiting from the column 230 contains about 2 wt % carbon dioxide.

The aqueous exit stream 231 from the carbon dioxide stripping column 230 is split into two streams, a first aqueous liquor stream 233 (about 30 wt % of the total) being diverted to a lime slaker/causticizer 240 and the second aqueous liquor stream 234 being passed to the evaporator 235.

The second aqueous liquor stream 234 is introduced into the evaporator 235, where a water vapor stream 236 is removed, primarily to concentrate the stream 234 and secondly to decompose additional bicarbonate in the stream 234. The water vapor stream 236 contains a small amount of carbon dioxide, from bicarbonate decomposition. The $CO_2$-stripped and evaporated mother liquor stream 237 that is removed from the evaporator contains 27.0 wt % $Na_2CO_3$ and 2.5 wt % $NaHCO_3$. This stream 237 is passed to the neutralizer 250.

A dilute caustic soda solution is prepared for use in the neutralizer 250 as follows. In the slaker/causticizer 240, lime 241 is introduced at a rate of about 690 lb/hr, to react with the alkali in the $CO_2$-stripped liquor stream 233 and produce dilute caustic soda (sodium hydroxide) 242. The caustic soda stream 242 is removed from the causticizer 240, passed to a filter 245 to remove lime muds ($CaCO_3$ and nonreactive CaO) 246 at a rate of 1174 lb/hr. The resulting filtered, dilute caustic soda stream 247 contains 2.0 wt % NaOH, 19.0 wt % $Na_2CO_3$ and about 1 wt % NaCl. This dilute caustic soda stream 247 is fed to the neutralizer 250, at a rate of 25,581 lb/hr, to neutralize sodium bicarbonate in the $CO_2$-stripped and evaporated mother liquor stream 237 that is also introduced into the neutralizer 250.

The neutralized liquor 251, removed from the neutralizer 250, has a composition containing 25.93 wt % $Na_2CO_3$, 0.04 wt % $NaHCO_3$ and about 1 wt % NaCl. The neutralized liquor stream 251 is introduced into the second crystallizer operation 260 at a rate of about 110 gallons/min. In the crystallizer 260, sodium carbonate monohydrate is crystallized as the sole crystalline species, at temperatures of about 75° C. to 100° C.

In the crystallization operation, water 261 is removed from the crystallizer 260 to crystallize sodium carbonate monohydrate. Crystallizer slurry 262 is removed from the crystallizer 260 and is passed to a centrifuige 265 where the slurry 262 is separated, yielding a damp centrifuge cake 266 and crystallizer mother liquor 267. The centrifuge cake 266, containing crystalline sodium carbonate monohydrate and about 6 wt % liquor, is passed to a dryer 270, operated at a temperature of about 115-160° C., to yield a dry, free-flowing soda ash product 271, dense soda ash, produced at a rate of about 15,000 lb/hr. The dryer 270 also vents a gas stream 272 containing water, from the hydrated water removed during drying from the sodium carbonate monohydrate and residual moisture in the centrifuge cake 266.

The separated crystallizer mother liquor 267, containing 25.0 wt % $Na_2CO_3$, 0.2 wt % $NaHCO_3$ and about 7 wt % NaCl, is recycled to the crystallizer 260. A liquor purge stream, substantially free of crystallized solids, is removed from the crystallizer 260 as stream 267A.

Example 4

Example 4 illustrates the process of this invention in an embodiment similar to that of Example 3, but where the aqueous minewater effluent stream is at elevated temperature, 60° C., instead of 18° C. as used in Example 3.

In other respects, the parameters used for this Example 4 are similar to those of Example 3. The two crystallized products are processed further to make soda ash, in a continuous process having an annual output of 100,000 tons soda ash per year. The aqueous minewater effluent is again concentrated in a preliminary evaporation step, the sodium sesquicarbonate is again produced in a cooling crystallizer, at a crystallizer composition that is on the left side of sesquicarbonate region of the phase diagram, and there is no recycle of sesquicarbonate crystallizer mother liquor.

As in Example 3, aqueous mother liquor from the sesquicarbonate crystallizer operation is again subjected to steam stripping and evaporation to decompose sodium bicarbonate to carbonate, prior to the neutralization step which effects further conversion of bicarbonate to carbonate. Caustic soda used in the neutralization step is again made by reaction of lime with mother liquor from the sodium sesquicarbonate crystallization operation.

This Example 4 is noteworthy for the following:
- 60% of the total soda ash output is dense soda ash, from sodium carbonate monohydrate, and 40% is light ash, from calcined sodium sesquicarbonate, the same percentage split as obtained for Example 3
- total alkali (sodium carbonate) recovery from the aqueous minewater feed stream is again high, about 90%
- lime usage in the neutralization step is higher than that in Example 3, being about 3770 tons/year, primarily due to the fact that higher bicarbonate concentrations are present in both the minewater and sesquicarbonate mother liquor
- the warmer minewater of this Example 4 contains a higher TA concentration, as compared to Example 3, allowing a reduced minewater flow rate to be processed while still recovering 100,000 tons/year of combined soda ash.

The process of Example 4 may also be understood by reference to the schematic flow diagram shown in FIG. 4, which depicts the process 200 of this invention. Details of the process of Example 4 are as follows, referring now to FIG. 4.

The process 200 of Example 4 employs as a feed stream 201, an aqueous minewater stream at a temperature of 60° C. having a composition as follows: 12.7 wt % $Na_2CO_3$, 8.5 wt % $NaHCO_3$ and about 0.5 wt % NaCl. This aqueous minewater stream 201 has a total alkali value of 18.1 wt % TA, is saturated at 60° C., and is introduced into the process 200 at a flow rate of about 260 gallons/min.

This aqueous minewater stream 201 is introduced into an evaporator 205 that is operated at a temperature of about 120° C., and the exit gas stream 206 from the evaporator 205 removes both water and carbon dioxide (from bicarbonate decomposition) from stream 201.

The evaporated aqueous feed stream 206 exiting from the evaporator 205 contains 19.9 wt % $Na_2CO_3$ and 8.3 wt % $NaHCO_3$ and is introduced at a rate of about 180 gallons/min into the first crystallizer operation 210, a cooling crystallizer operated at about 46° C. Sodium sesquicarbonate is crystallized in the crystallizer 210, with no other crystal species being co-crystallized. In the crystallization operation, water 211 is removed from the crystallizer 210. Crystallizer slurry 212 is removed from the crystallizer and is passed to a centrifuge 215 where the slurry is separated, yielding a damp centrifuge cake 216 and crystallizer mother liquor 217. The centrifuge cake 216, containing about 6 wt % liquor, is passed to a calciner 220, operated at a temperature between about 150° C. to 350° C., to yield a dry, free-flowing soda ash product 221, light soda ash, produced at a rate of about 10,000 lb/hr. The calciner 220 also vents a gas stream 222 containing water and carbon dioxide from the calcination of the crystalline sodium sesquicarbonate 216 to light soda ash 221.

The crystallizer mother liquor 217 is directed to a carbon dioxide stripping column 230 and an evaporator 235 to decompose a portion of sodium bicarbonate in the mother liquor stream 217. The crystallizer mother liquor stream 217 is first introduced into the carbon dioxide stripping column 230. A hot vapor stream 236 exiting from the downstream evaporator 235 is introduced into the column 230, operated at temperatures between about 100° C. to 150° C., to decompose about 25% of the bicarbonate content of the stream 217.

The aqueous stream 231 removed from the carbon dioxide stripping column 230 contains 18.6 wt % $Na_2CO_3$, 3.5 wt % $NaHCO_3$ and about 1 wt % NaCl. The water vapor stream 232 exiting from the column 230 contains about 3 wt % carbon dioxide.

The aqueous exit stream 231 from the carbon dioxide stripping column 230 is split into two streams, a first aqueous liquor stream 233 (about 40 wt % of the total) being diverted to a lime slaker/causticizer 240, and the second aqueous liquor stream 234 being passed to the evaporator 235.

The second aqueous liquor stream 234 is introduced into the evaporator 235, where a water vapor stream 236 is removed, primarily to concentrate the stream 234 and secondly to decompose additional bicarbonate in the stream 234. The water vapor stream 236 contains a small amount of carbon dioxide, from bicarbonate decomposition. The $CO_2$-stripped and evaporated mother liquor stream 237 that is removed from the evaporator contains 26.3 wt % $Na_2CO_3$ and 3.4 wt % $NaHCO_3$. This stream 237 is passed to the neutralizer 250.

A dilute caustic soda solution is prepared for use in the neutralizer 250 as follows. In the slaker/causticizer 240, lime 241 is introduced at a rate of about 950 lb/hr, to react with the alkali in the $CO_2$-stripped liquor stream 233 and produce dilute caustic soda (sodium hydroxide) 242. The caustic soda stream 242 is removed from the causticizer 240, passed to a filter 245 to remove lime muds ($CaCO_3$ and nonreactive CaO) 246. The resulting filtered, dilute caustic soda stream 247 contains 1.9 wt % NaOH, 18.7 wt % $Na_2CO_3$ and about 1 wt % NaCl. This dilute caustic soda stream 247 is fed to the neutralizer 250 to neutralize sodium bicarbonate in the $CO_2$-stripped and evaporated mother liquor stream 237 that is also introduced into the neutralizer 250.

The neutralized liquor 251, removed from the neutralizer 250, has a composition containing 25.2 wt % $Na_2CO_3$, 0.03 wt % $NaHCO_3$ and about 1 wt % NaCl. The neutralized liquor stream 251 is introduced into the second crystallizer operation 260 at a rate of about 110 gallons/min. In the crystallizer 260, sodium carbonate monohydrate is crystallized as the sole crystalline species, at temperatures of about 75° C. to 100° C.

In the crystallization operation, water 261 is removed from the crystallizer 260 to crystallize sodium carbonate monohydrate. Crystallizer slurry 262 is removed from the crystallizer 260 and is passed to a centrifuge 265 where the slurry 262 is separated, yielding a damp centrifuge cake 266 and crystallizer mother liquor 267. The centrifuge cake 266, containing crystalline sodium carbonate monohydrate and about 6 wt % liquor, is passed to a dryer 270, operated at a temperature of about 115-160° C., to yield a dry, free-flowing soda ash product 271, dense soda ash, produced at a rate of about 15,200 lb/hr. The dryer 270 also vents a gas stream 272 containing water, from the hydrated water removed during drying from the sodium carbonate monohydrate and residual moisture in the centrifuge cake 266.

The separated crystallizer mother liquor 267, containing 25.0 wt % $Na_2CO_3$, 0.2 wt % $NaHCO_3$ and about 7 wt % NaCl, is recycled to the crystallizer 260. A liquor purge stream, substantially free of crystallized solids, is removed from the crystallizer 260 as stream 267A.

Example 5

Example 5 illustrates yet another aspect of the process of this invention, in which the sodium sesquicarbonate crystallization operation is modified to carry out an initial portion of the crystallization in an evaporative crystallizer and the final portion of the crystallization in a cooling crystallizer. In addition, Example 5 illustrates how the process of this invention can be adjusted to produce relatively large amounts of one of the two products, e.g., light soda ash in this Example. Example 5 uses an aqueous minewater effluent stream at an elevated temperature of 60° C., as was also is used in Examples 2 and 4.

In Example 5, the sodium sesquicarbonate and sodium carbonate monohydrate crystallization products are processed further to make soda ash, in a continuous process having an annual output of 100,000 tons soda ash per year, as was also the case in each of the previous examples.

Figure 5:
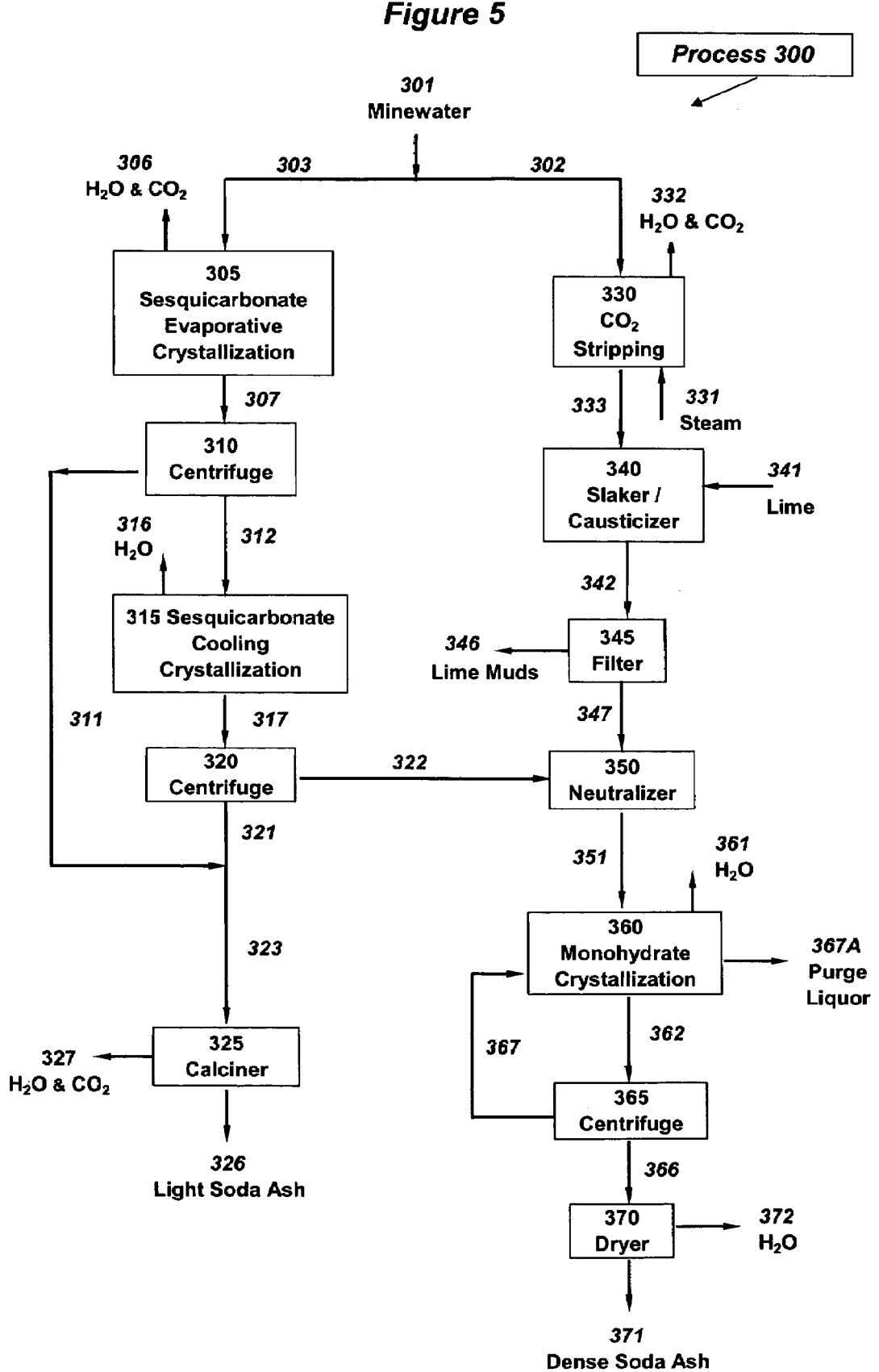
FIG. 5 is a schematic flow diagram showing the steps and operations in producing sodium sesquicarbonate and sodium carbonate monohydrate in yet another embodiment of the process of this invention, discussed in Examples 5 and 6.

Noteworthy aspects and significant differences in this Example 5 from the previous examples include the following:

- 90% of the total soda ash output is light ash, from calcined sodium sesquicarbonate, and 10% is dense ash, from sodium carbonate monohydrate
- total alkali (sodium carbonate) recovery from the aqueous minewater feed stream is still high, about 91%
- lime usage in the neutralization step is very low, about 270 tons/year, since the product split produces a relatively small proportion of monohydrate product
- the sodium sesquicarbonate crystallization is carried out in two steps, in an initial evaporative crystallizer and then in a final cooling crystallizer
- there is no preliminary evaporation step for the aqueous minewater stream, prior to its introduction into the sodium sesquicarbonate crystallization operation
- the sodium sesquicarbonate crystallizer mother liquor from the final (cooling) crystallization is introduced directly into the neutralization step to decompose sodium bicarbonate into carbonate, as was also done in Examples 1 and 2, without preliminary steam stripping or evaporation steps
- caustic soda used in the neutralization step is made by reaction of lime with aqueous minewater effluent, after the latter is subjected to a $CO_2$ stripping step to decompose sodium bicarbonate The process of Example 5 may be understood by reference to the schematic flow diagram shown in FIG. 5, which depicts the process 300 of this invention. Details of the process of Example 5 are as follows, referring now to FIG. 5.

The process 300 of Example 5 employs as a feed stream 301, an aqueous minewater stream at a temperature of 60° C. having a composition as follows: 12.7 wt % $Na_2CO_3$, 8.5 wt % $NaHCO_3$ and about 0.5 wt % NaCl. This aqueous minewater stream 301 has a total alkali value of 18.0 wt % TA, is saturated at 60° C., and is introduced into the process 300 at a flow rate of about 260 gallons/min.

About 2% of the minewater stream 301 is diverted, as stream 302, for use in the causticization step 340, as described below, with the balance 303 of the stream, about 250 gallons/min, being directed to the sodium sesquicarbonate crystallization operation, as a feed stream 303 to evaporative crystallizer 305.

In the evaporative crystallizer 305, sodium sesquicarbonate is crystallized, with no other crystal species being co-crystallized. The evaporative crystallizer 305 is operated at a temperature of about 89° C., and the exit gas stream 306 removes both water and carbon dioxide (from bicarbonate decomposition) from the evaporator 305.

Crystallizer slurry 307 is removed from the evaporative crystallizer 305 and is passed to a centrifuge 310 where the slurry is separated, yielding a damp centrifuge cake 311 and crystallizer mother liquor 312. The centrifuge cake 311, containing about 6 wt % liquor, is combined with centrifuge cake 321 obtained from the cooling crystallizer 315, described below.

The evaporative crystallizer mother liquor stream 312 from the evaporative crystallizer 305 contains 26.0 wt % $Na_2CO_3$, 3.2 wt % $NaHCO_3$ and about 4 wt % NaCl. This mother liquor stream 312 is introduced into cooling crystallizer 315, a cooling crystallizer operated at about 44° C.

Sodium sesquicarbonate is crystallized in the cooling crystallizer 315, with no other crystal species being co-crystallized. In the cooling crystallizer, water 316 is removed from the crystallizer 315. Crystallizer slurry 317 is removed from the crystallizer and is passed to a centrifuge 320 where the slurry is separated, yielding a damp centrifuge cake 321 and crystallizer mother liquor 322.

The centrifuge cake 321 from the cooling crystallizer 315, containing about 6 wt % liquor, is combined with centrifuge cake 311 from the evaporative crystallizer 305. The combined cake 323 is passed to a calciner 325, operated at a temperature between about 150° C. to 350° C., to yield a dry, free-flowing soda ash product 326, light soda ash, produced at a rate of about 22,700 lb/hr. The calciner 325 also vents a gas stream 327 containing water and carbon dioxide from the calcination of the crystalline sodium sesquicarbonate 323 to light soda ash 326.

The crystallizer mother liquor stream 322 from the cooling crystallizer 315 contains 26.8 wt % $Na_2CO_3$, 0.5 wt % $NaHCO_3$ and about 4 wt % NaCl and is introduced to the neutralizer 350.

Caustic soda is prepared for the neutralization operation 350, as follows. The diverted portion 302 of aqueous minewater stream 301, having the same composition as the main minewater feed stream 301, is introduced into a carbon dioxide stripping column 330. Steam 331 is introduced into the column 330, operated at temperatures between about 140° C. to 170° C., to decompose about 50% of the bicarbonate content of the stream 302, with a gas stream 332 venting water and carbon dioxide from the top of the column 330. The minewater liquor exit stream 333 contains 15.5 wt % $Na_2CO_3$, 4.3 wt % $NaHCO_3$ and about 0.5 wt % NaCl and is next introduced into a lime slaker/causticizer 340.

Lime 341 is also introduced into the lime slaker/causticizer 340, at a rate of about 70 lb/hr, to react with the alkali in the mother liquor 333 and produce dilute caustic soda (sodium hydroxide) 342. The caustic soda stream 342 is removed from the causticizer 340, passed to a filter 345 to remove lime muds ($CaCO_3$ and nonreactive CaO) 346. The resulting filtered, dilute caustic soda stream 347 contains 1.7 wt % NaOH, 16.4 wt % $Na_2CO_3$ and about 0.5 wt % NaCl, and this stream 347 is fed to the neutralizer 350.

The sesquicarbonate cooling crystallizer mother liquor stream 322 and dilute caustic soda stream 347 are reacted in the neutralizer 350 to yield a neutralized liquor 351 that is low in bicarbonate content. The neutralized liquor 351 removed from the neutralizer 350 has a composition containing 26.1 wt % $Na_2CO_3$, 0.05 wt % $NaHCO_3$ and about 4 wt % NaCl. The neutralized liquor stream 351 is introduced into the second (sodium carbonate monohydrate) crystallizer operation 360 at a rate of about 30 gallons/min. In the crystallizer 360, sodium carbonate monohydrate is crystallized as the sole crystalline species, at temperatures of about 75° C. to 100° C.

In the crystallization operation 360, water 361 is removed from the crystallizer 360 to crystallize sodium carbonate monohydrate. Crystallizer slurry 362 is removed from the crystallizer 360 and is passed to a centrifuge 365 where the slurry 362 is separated, yielding a damp centrifuge cake 366 and crystallizer mother liquor 367. The centrifuge cake 366, containing crystalline sodium carbonate monohydrate and about 6 wt % liquor, is passed to a dryer 370, operated at a temperature of about 115-160° C., to yield a dry, free-flowing soda ash product 371, dense soda ash, produced at a rate of about 2,400 lb/hr. The dryer 370 also vents a gas stream 372 containing water, from the hydrated water removed during drying from the sodium carbonate monohydrate and residual moisture in the centrifuge cake 366.

The separated crystallizer mother liquor 367, containing 24.9 wt % $Na_2CO_3$, 0.09 wt % $NaHCO_3$ and about 7 wt % NaCl, is recycled to the crystallizer 360. A liquor purge stream, substantially free of crystallized solids, is removed from the crystallizer 360 as stream 367A.

Example 6

Example 6 illustrates yet another aspect of the process of this invention, with unit operations the same as those of Example 5, to demonstrate that the process may also be used with very high temperature aqueous minewater effluent streams. In this Example 6, the aqueous minewater stream is at 90° C., instead of 60° C. as used in Example 5. In addition, the relative proportions of the two soda ash products are more balanced in this Example 6, in contrast to the 90:10 light ash:dense ash product split in the previous example.

In other respects, the parameters of this Example 6 are similar to that of Example 5 (see Example 5 for details). As in all of the previous examples, the sodium sesquicarbonate and sodium carbonate monohydrate crystallization products are processed further to make soda ash, in a continuous process having an annual output of 100,000 tons soda ash per year.

This Example 6 is noteworthy for the following:
 60% of the total soda ash output is light ash, from calcined sodium sesquicarbonate, and 40% is dense ash, from sodium carbonate monohydrate
 total alkali (sodium carbonate) recovery from the aqueous minewater feed stream is again high, about 92%
 sodium sesquicarbonate crystallization operation is again carried out in two steps, in an initial evaporative crystallizer and then in a final cooling crystallizer
 lime usage in the neutralization step is about 1140 tons/year The process of Example 6 may also be understood by reference to the schematic flow diagram shown in FIG. 5, which depicts the process 300 of this invention. Details of the process of Example 6 are as follows, referring now to FIG. 5.

The process 300 of Example 6 employs as a feed stream 301, an aqueous minewater stream at a temperature of 90° C. having a composition as follows: 16.0 wt % $Na_2CO_3$, 11.0 wt % $NaHCO_3$ and about 0.5 wt % NaCl. This aqueous minewater stream 301 has a total alkali value of 22.9 wt % TA, is saturated at 90° C., and is introduced into the process 300 at a flow rate of about 190 gallons/min.

About 8% of the minewater stream 301 is diverted, as stream 302, for use in the causticization step 340, as described below, with the balance 303 of the stream, about 179 gallons/min, being directed to the sodium sesquicarbonate crystallization operation, as a feed stream 303 to evaporative crystallizer 305.

In the evaporative crystallizer 305, sodium sesquicarbonate is crystallized, with no other crystal species being co-crystallized. The evaporative crystallizer 105 is operated at a temperature of about 96° C., and the exit gas stream 306 removes both water and carbon dioxide (from bicarbonate decomposition) from the evaporator 305.

Crystallizer slurry 307 is removed from the evaporative crystallizer 305 and is passed to a centrifuge 310 where the slurry is separated, yielding a damp centrifuge cake 311 and crystallizer mother liquor 312. The centrifuge cake 311, containing about 6 wt % liquor, is combined with centrifuge cake 321 obtained from the cooling crystallizer 315, described below.

The evaporative crystallizer mother liquor stream 312 from the evaporative crystallizer 305 contains 25.5 wt % $Na_2CO_3$, 5.0 wt % $NaHCO_3$ and about 1 wt % NaCl. This mother liquor stream 312 is introduced into cooling crystallizer 315, a cooling crystallizer operated at about 40° C.

Sodium sesquicarbonate is crystallized in the cooling crystallizer 315, with no other crystal species being co-crystallized. In the cooling crystallizer, water 316 is removed from the crystallizer 315. Crystallizer slurry 317 is removed from the crystallizer 315 and is passed to a centrifuge 320 where the slurry is separated, yielding a damp centrifuge cake 321 and crystallizer mother liquor 322.

The centrifuge cake 321 from the cooling crystallizer 315, containing about 6 wt % liquor, is combined with centrifuge cake 311 from the evaporative crystallizer 305. The combined cake 323 is passed to a calciner 325, operated at a temperature between about 150° C. to 350° C., to yield a dry, free-flowing soda ash product 326, light soda ash, produced at a rate of about 15,000 lb/hr. The calciner 325 also vents a gas stream 327 containing water and carbon dioxide from the calcination of the crystalline sodium sesquicarbonate 323 to light soda ash 326.

The crystallizer mother liquor stream 322 from the cooling crystallizer 315 contains 25.3 wt % $Na_2CO_3$, 1.1 wt % $NaHCO_3$ and about 1 wt % NaCl. The mother liquor stream 322 is introduced to the neutralizer 350.

Caustic soda is prepared for the neutralization operation 350, as follows. The diverted portion 302 of aqueous minewater stream 301, having the same composition as the main minewater feed stream 301, is introduced into a carbon dioxide stripping column 330. Steam 331 is introduced into the column 330, operated at temperatures between about 140° C. to 170° C., to decompose about 65% of the bicarbonate content of the stream 302, with a gas stream 332 venting water and carbon dioxide from the top of the column 330. The minewater liquor exit stream 333 contains 20.9 wt % $Na_2CO_3$, 3.9 wt % $NaHCO_3$ and about 0.5 wt % NaCl and is next introduced into a lime slaker/causticizer 340.

Lime 341 is also introduced into the lime slaker/causticizer 340, at a rate of about 280 lb/hr, to react with the alkali in the mother liquor 333 and produce dilute caustic soda (sodium hydroxide) 342. The caustic soda stream 342 is removed from the causticizer 340, passed to a filter 345 to remove lime muds ($CaCO_3$ and nonreactive CaO) 346. The resulting filtered, dilute caustic soda stream 347 contains 2.2 wt % NaOH, 21.0 wt % $Na_2CO_3$ and about 0.5 wt % NaCl, and this stream 347 is fed to the neutralizer 350.

The sesquicarbonate cooling crystallizer mother liquor stream 322 and dilute caustic soda stream 347 are reacted in the neutralizer 350 to yield a neutralized liquor 351 that is low in bicarbonate content. The neutralized liquor 351, removed from the neutralizer 350, has a composition containing 25.6 wt % $Na_2CO_3$, 0.09 wt % $NaHCO_3$ and about 1 wt % NaCl. The neutralized liquor stream 351 is introduced into the second (sodium carbonate monohydrate) crystallizer operation 360 at a rate of about 70 gallons/min. In the crystallizer 360, sodium carbonate monohydrate is crystallized as the sole crystalline species, at temperatures of about 75° C. to 100° C.

In the crystallization operation 360, water 361 is removed from the crystallizer 360 to crystallize sodium carbonate monohydrate. Crystallizer slurry 362 is removed from the crystallizer 360 and is passed to a centrifuge 365 where the slurry 362 is separated, yielding a damp centrifuge cake 366 and crystallizer mother liquor 367. The centrifuge cake 366, containing crystalline sodium carbonate monohydrate and about 6 wt % liquor, is passed to a dryer 370, operated at a temperature of about 115°-160° C., to yield a dry, free-flowing soda ash product 371, dense soda ash, produced at a rate of about 10,200 lb/hr. The dryer 370 also vents a gas stream 372 containing water, from the hydrated water removed during drying from the sodium carbonate monohydrate and residual moisture in the centrifuge cake 366.

The separated crystallizer mother liquor 367, containing 24.9 wt % $Na_2CO_3$, 0.5 wt % $NaHCO_3$ and about 7 wt % NaCl, is recycled to the crystallizer 360. A liquor purge stream, substantially free of crystallized solids, is removed from the crystallizer 360 as stream 367A.

It will be appreciated by those skilled in the art that changes could be made to the embodiments described above without departing from the broad inventive concept thereof. It is understood, therefore, that this invention is not limited to the particular embodiments disclosed but is intended to cover modifications within the spirit and scope of the present invention as defined by the appended claims.

What is claimed is:

1. A process for the production of crystalline sodium sesquicarbonate and sodium carbonate from a solution minewater stream comprising
   (a) withdrawing an aqueous minewater stream containing sodium carbonate and sodium bicarbonate from a solution mining cavity in a subterranean alkali ore deposit;
   (b) crystallizing, in a first crystallizer operation, sodium sesquicarbonate from the aqueous minewater stream, the crystallization being carried out in the sodium sesquicarbonate region of the sodium carbonate-sodium bicarbonate-water system phase diagram without significant co-crystallization of other alkali species, and wherein the aqueous minewater stream introduced into the first crystallizer is substantially free of added sodium carbonate calcinate selected from the group consisting of calcined sodium sesquicarbonate and calcined trona ore;
   (c) separating crystalline sodium sesquicarbonate from mother liquor in the first crystallizer slurry and recovering crystalline sodium sesquicarbonate as a first product;
   (d) converting at least a portion of residual dissolved sodium bicarbonate in the separated first crystallizer mother liquor to carbonate, in a treatment sufficient to permit crystallization of sodium carbonate monohydrate from the treated first crystallizer mother liquor as the sole crystalline species;
   (e) crystallizing, in a second crystallizer operation, sodium carbonate monohydrate from the separated and treated first crystallizer mother liquor, wherein the separated first crystallizer mother liquor introduced to the second crystallizer is substantially free of added sodium carbonate calcinate selected from the group consisting of calcined sodium sesquicarbonate and calcined trona ore;
   (f) separating crystalline sodium carbonate monohydrate from mother liquor in the second crystallizer slurry and recovering the crystalline sodium carbonate monohydrate; and
   (g) drying the recovered crystalline sodium carbonate monohydrate to produce dense soda ash, as a second product.

2. The process of claim 1 which further comprises
   effecting conversion of at least a portion of the residual sodium bicarbonate to carbonate in the separated first crystallizer mother liquor by neutralizing residual dissolved sodium bicarbonate, using a neutralizing agent selected from the group consisting of lime, slaked lime, and caustic soda; and introducing the neutralized first crystallizer mother liquor into the second crystallizer operation.

3. A process for the production of crystalline sodium sesquicarbonate and sodium carbonate from a solution minewater stream comprising (a) withdrawing an aqueous minewater stream containing sodium carbonate and sodium bicarbonate from a solution mining cavity in a subterranean alkali ore deposit;

(b) evaporating water from the aqueous minewater stream to concentrate the aqueous stream;

(c) crystallizing, in a first crystallizer operation, sodium sesquicarbonate from the concentrated aqueous minewater stream, the crystallization being carried out in the sodium sesquicarbonate region of the sodium carbonate-sodium bicarbonate-water system phase diagram without significant co-crystallization of other alkali species, and wherein the aqueous minewater stream introduced into the first crystallizer is substantially free of added sodium carbonate calcinate selected from the group consisting of calcined sodium sesquicarbonate and calcined trona ore;

(d) separating crystalline sodium sesquicarbonate from mother liquor in the first crystallizer slurry and recovering crystalline sodium sesquicarbonate as a first product;

(e) converting at least a portion of residual dissolved sodium bicarbonate in the separated first crystallizer mother liquor to carbonate, in a treatment sufficient to permit crystallization of sodium carbonate monohydrate from the treated first crystallizer mother liquor as the sole crystalline species;

(f) crystallizing, in a second crystallizer operation, sodium carbonate monohydrate from the separated and treated first crystallizer mother liquor, wherein the separated first crystallizer mother liquor introduced to the second crystallizer is substantially free of added sodium carbonate calcinate selected from the group consisting of calcined sodium sesquicarbonate and calcined trona ore;

(g) separating crystalline sodium carbonate monohydrate from mother liquor in the second crystallizer slurry and recovering the crystalline sodium carbonate monohydrate; and (h) drying the recovered crystalline sodium carbonate monohydrate to produce dense soda ash, as a second product.

4. The process of claim 3 wherein sufficient water is evaporated from the withdrawn aqueous minewater stream, prior to its introduction into the first crystallizer operation, to yield an aqueous stream containing at least about 18 wt % sodium carbonate.

5. The process of claim 3 which further comprises recycling a portion of the separated first crystallizer mother liquor to the evaporation step.

6. The process of claim 5 wherein sufficient water is evaporated from the withdrawn aqueous minewater stream and recycled mother liquor, prior to their introduction into the first crystallizer operation, to yield an aqueous stream from the evaporator containing at least about 24 wt % sodium carbonate.

7. The process of claim 3 which further comprises effecting conversion of at least a portion of the residual sodium bicarbonate to carbonate in the separated first crystallizer mother liquor by neutralizing residual dissolved sodium bicarbonate, using a neutralizing agent selected from the group consisting of lime, slaked lime, and caustic soda; and introducing the neutralized first crystallizer mother liquor into the second crystallizer operation.

8. A process for the production of crystalline sodium sesquicarbonate and sodium carbonate monohydrate from a solution minewater stream comprising (a) withdrawing an aqueous minewater stream containing sodium carbonate and sodium bicarbonate from a solution mining cavity in a subterranean alkali ore deposit;

(b) crystallizing, in a first crystallizer operation, sodium sesquicarbonate from the aqueous minewater stream, the crystallization being carried out in the sodium sesquicarbonate region of the sodium carbonate-sodium bicarbonate-water system phase diagram without significant co-crystallization of other alkali species, and wherein the aqueous minewater stream introduced into the first crystallizer is substantially free of added sodium carbonate calcinate selected from the group consisting of calcined sodium sesquicarbonate and calcined trona ore;

(c) separating crystalline sodium sesquicarbonate from mother liquor in the first crystallizer slurry and recovering crystalline sodium sesquicarbonate as a first product;

(d) neutralizing residual dissolved sodium bicarbonate in the separated first crystallizer mother liquor, to convert at least a portion of the residual sodium bicarbonate to carbonate, in a neutralization treatment sufficient to permit crystallization of sodium carbonate monohydrate from the neutralized first crystallizer mother liquor as the sole crystalline species;

(e) crystallizing, in a second crystallizer operation, sodium carbonate monohydrate from the separated and neutralized first crystallizer mother liquor, wherein the separated first crystallizer mother liquor introduced to the second crystallizer is substantially free of added sodium carbonate calcinate selected from the group consisting of calcined sodium sesquicarbonate and calcined trona ore;

(f) separating crystalline sodium carbonate monohydrate from mother liquor in the second crystallizer slurry and recovering the crystalline sodium carbonate monohydrate; and (g) drying the recovered crystalline sodium carbonate monohydrate to produce dense soda ash, as a second product.

9. The process of claim 8 which further comprises using a neutralizing agent selected from the group consisting of lime, slaked lime, and caustic soda.

10. The process of claim 1, 3 or 8 wherein the alkali ore deposit contains trona ore.

11. The process of claim 1, 3 or 8 wherein the first crystallizer operation uses a crystallizer selected from the group consisting of a cooling crystallizer, an evaporative crystallizer and combinations thereof.

12. The process of claim 1 or 8 which further comprises evaporating water from the withdrawn aqueous minewater stream, prior to its introduction into the first crystallizer operation, to concentrate the aqueous stream and yield an aqueous stream containing at least about 18 wt % sodium carbonate.

13. The process of claim 12 which further comprises recycling a portion of the separated first crystallizer mother liquor to the evaporation step.

14. The process of claim 13 wherein sufficient water is evaporated from the withdrawn aqueous minewater stream and recycled mother liquor, prior to their introduction into the first crystallizer operation, to yield an aqueous stream from the evaporator containing at least about 24 wt % sodium carbonate.

15. The process of claim 1, 3 or 8 wherein sufficient residual sodium bicarbonate is converted to carbonate to yield a treated first crystallizer mother liquor containing less than about 1 wt % sodium bicarbonate.

16. The process of claim 1, 3 or 8 wherein sufficient residual sodium bicarbonate is converted to carbonate to yield a treated first crystallizer mother liquor containing less than about 0.5 wt % sodium bicarbonate.

17. The process of claim 1, 3 or 8 which further comprises steam stripping of the separated first crystallizer mother liquor, to effect conversion of at least a portion of the sodium bicarbonate to carbonate, by thermal decomposition of bicarbonate in the first crystallizer mother liquor and removal of carbon dioxide decomposition byproduct.

18. The process of claim 1, 3 or 8 which further comprises evaporating the separated first crystallizer mother liquor at elevated temperature, to effect conversion of at least a portion of the sodium bicarbonate to carbonate, by thermal decomposition of bicarbonate in the first crystallizer mother liquor and removal of carbon dioxide decomposition byproduct.

19. The process of claim 1, 3 or 8 which further comprises carrying out the sodium bicarbonate conversion concurrently with crystallization of the sodium carbonate monohydrate in the second crystallizer operation, by thermal decomposition of the bicarbonate in the liquor in the second crystallizer operation and removal of carbon dioxide decomposition byproduct.

20. The process of claim 1, 3 or 8 which further comprises calcining the sodium sesquicarbonate first product to produce light soda ash.

* * * * *